(12) United States Patent
Hinckley et al.

(10) Patent No.: US 8,982,045 B2
(45) Date of Patent: *Mar. 17, 2015

(54) USING MOVEMENT OF A COMPUTING DEVICE TO ENHANCE INTERPRETATION OF INPUT EVENTS PRODUCED WHEN INTERACTING WITH THE COMPUTING DEVICE

(75) Inventors: Kenneth P. Hinckley, Redmond, WA (US); Michel Pahud, Kirkland, WA (US); Wenqi Shen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

This patent is subject to a terminal disclaimer.

(21) Appl. No.: 12/970,943

(22) Filed: Dec. 17, 2010

(65) Prior Publication Data

US 2012/0154294 A1    Jun. 21, 2012

(51) Int. Cl.
*G09G 5/00*   (2006.01)
*G06F 1/16*   (2006.01)
(Continued)

(52) U.S. Cl.
CPC .......... *G06F 1/1649* (2013.01); *G06F 1/1677* (2013.01); *G06F 1/169* (2013.01);
(Continued)

(58) Field of Classification Search
CPC ............. G06F 3/04883; G06F 3/0488; G06F 2203/04808; G06F 3/03547; G06F 3/0346; G06F 3/0414; G06F 1/169; G06F 3/017; G06F 2203/04104; G06F 3/0412; G06F 3/0354; G06F 2200/1637; H04M 2250/22; H04M 2250/12; H04M 2250/16; H04M 1/72527; A63F 2300/1075
USPC .......... 345/649, 660, 672, 156–184; 715/788, 715/815, 863, 864; 455/566
See application file for complete search history.

(56) References Cited

U.S. PATENT DOCUMENTS

| 5,198,623 A | 3/1993 | Landmeier |
| 5,414,227 A | 5/1995 | Schubert et al. |

(Continued)

FOREIGN PATENT DOCUMENTS

| CN | 101809581 A | 8/2010 |
| KR | 10-2012-0005417 A | 1/2012 |
| WO | 2009084809 A1 | 7/2009 |

OTHER PUBLICATIONS

Bjørneseth, et al., "Dynamic Positioning Systems—Usability and Interaction Styles," retrieved at <<http://www.ceng.metu.edu.tr/~tcan/se705_s0809/Schedule/assignment3.pdf>>, Proceedings of the 5th Nordic Conference on Human-Computer Interaction: Building Bridges, Oct. 2008, 10 pages.

(Continued)

*Primary Examiner* — Amare Mengistu
*Assistant Examiner* — Gloryvid Figueroa-Gibson
(74) *Attorney, Agent, or Firm* — Heikki Einola; Judy Yee; Micky Minhas

(57) ABSTRACT

A computing device is described herein which collects input event(s) from at least one contact-type input mechanism (such as a touch input mechanism) and at least one movement-type input mechanism (such as an accelerometer and/or gyro device). The movement-type input mechanism can identify the orientation of the computing device and/or the dynamic motion of the computing device. The computing device uses these input events to interpret the type of input action that has occurred, e.g., to assess when at least part of the input action is unintentional. The computing device can then perform behavior based on its interpretation, such as by ignoring part of the input event(s), restoring a pre-action state, correcting at least part of the input event(s), and so on.

20 Claims, 18 Drawing Sheets

(51) Int. Cl.
*G06F 3/041* (2006.01)
*G06F 3/0483* (2013.01)
*G06F 3/0485* (2013.01)
*G06F 3/0488* (2013.01)

(52) U.S. Cl.
CPC ............ *G06F 1/1694* (2013.01); *G06F 3/0416* (2013.01); *G06F 3/0483* (2013.01); *G06F 3/0485* (2013.01); *G06F 2203/04806* (2013.01); *G06F 2203/04808* (2013.01); *G06F 3/04883* (2013.01); *G06F 3/04886* (2013.01)
USPC .......................................... 345/156; 345/173

(56) References Cited

U.S. PATENT DOCUMENTS

| | | | |
|---|---|---|---|
| 5,463,725 A | 10/1995 | Henckel et al. | |
| 5,625,833 A | 4/1997 | Levine | |
| 5,867,163 A | 2/1999 | Kurtenbach | |
| 5,914,701 A | 6/1999 | Gersheneld et al. | |
| 5,956,020 A | 9/1999 | D'Amico et al. | |
| 6,307,548 B1 | 10/2001 | Flinchem et al. | |
| 6,788,292 B1 | 9/2004 | Nako et al. | |
| 6,906,703 B2 | 6/2005 | Vablais et al. | |
| 7,231,609 B2 | 6/2007 | Baudisch | |
| 7,289,102 B2 * | 10/2007 | Hinckley et al. | 345/156 |
| 7,362,221 B2 | 4/2008 | Katz | |
| 7,400,316 B2 | 7/2008 | Appleyard et al. | |
| 7,499,024 B2 | 3/2009 | Johnston, Jr. et al. | |
| 7,532,196 B2 | 5/2009 | Hinckley | |
| 7,567,242 B2 | 7/2009 | Perkins et al. | |
| 7,703,047 B2 | 4/2010 | Keely et al. | |
| 7,812,826 B2 | 10/2010 | Ording et al. | |
| 7,812,828 B2 | 10/2010 | Westerman et al. | |
| 7,847,789 B2 | 12/2010 | Kolmykov-Zotov et al. | |
| 7,956,847 B2 | 6/2011 | Christie | |
| 7,982,739 B2 * | 7/2011 | Pasula | 345/473 |
| 8,228,292 B1 * | 7/2012 | Ruiz et al. | 345/156 |
| 8,265,705 B2 * | 9/2012 | Lee | 455/566 |
| 8,413,077 B2 * | 4/2013 | Yamamoto et al. | 715/863 |
| 2003/0076310 A1 | 4/2003 | Kanzaki et al. | |
| 2003/0164821 A1 | 9/2003 | Rezania | |
| 2004/0012575 A1 | 1/2004 | Homer et al. | |
| 2004/0047505 A1 | 3/2004 | Ghassabian | |
| 2004/0140962 A1 | 7/2004 | Wang et al. | |
| 2004/0189594 A1 | 9/2004 | Sterling | |
| 2004/0203520 A1 | 10/2004 | Schirtzinger et al. | |
| 2005/0024346 A1 | 2/2005 | Dupraz et al. | |
| 2005/0079896 A1 | 4/2005 | Kokko et al. | |
| 2005/0179648 A1 | 8/2005 | Barabe et al. | |
| 2005/0216867 A1 | 9/2005 | Marvit et al. | |
| 2005/0253817 A1 | 11/2005 | Rytivaara et al. | |
| 2006/0012580 A1 | 1/2006 | Perski et al. | |
| 2006/0026535 A1 | 2/2006 | Hotelling et al. | |
| 2006/0109252 A1 | 5/2006 | Kolmykov-Zotov et al. | |
| 2006/0136840 A1 | 6/2006 | Keely et al. | |
| 2006/0146038 A1 | 7/2006 | Park et al. | |
| 2006/0177112 A1 | 8/2006 | Yang et al. | |
| 2006/0197750 A1 | 9/2006 | Kerr et al. | |
| 2006/0197753 A1 | 9/2006 | Hotelling | |
| 2006/0256008 A1 | 11/2006 | Rosenberg | |
| 2006/0267957 A1 | 11/2006 | Kolmykov-Zotov et al. | |
| 2006/0267958 A1 | 11/2006 | Kolmykov-Zotov et al. | |
| 2007/0002016 A1 | 1/2007 | Cho et al. | |
| 2007/0070051 A1 | 3/2007 | Westerman et al. | |
| 2007/0075965 A1 | 4/2007 | Huppi et al. | |
| 2007/0113198 A1 | 5/2007 | Robertson et al. | |
| 2007/0126732 A1 | 6/2007 | Robertson et al. | |
| 2007/0152976 A1 | 7/2007 | Townsend et al. | |
| 2007/0247441 A1 | 10/2007 | Kim et al. | |
| 2007/0268274 A1 | 11/2007 | Westerman et al. | |
| 2008/0002888 A1 | 1/2008 | Yuan | |
| 2008/0012835 A1 | 1/2008 | Rimon et al. | |
| 2008/0040692 A1 | 2/2008 | Sunday et al. | |
| 2008/0106520 A1 | 5/2008 | Free et al. | |
| 2008/0158145 A1 | 7/2008 | Westerman | |
| 2008/0158168 A1 | 7/2008 | Westerman et al. | |
| 2008/0163130 A1 | 7/2008 | Westerman | |
| 2008/0191898 A1 | 8/2008 | Janik | |
| 2008/0259043 A1 | 10/2008 | Buil et al. | |
| 2008/0292195 A1 | 11/2008 | Vijayasenan et al. | |
| 2009/0066663 A1 | 3/2009 | Chang et al. | |
| 2009/0073144 A1 | 3/2009 | Chen et al. | |
| 2009/0083847 A1 | 3/2009 | Fadell et al. | |
| 2009/0109182 A1 | 4/2009 | Fyke et al. | |
| 2009/0153525 A1 | 6/2009 | Chang | |
| 2009/0160816 A1 | 6/2009 | Westerman et al. | |
| 2009/0167702 A1 | 7/2009 | Nurmi | |
| 2009/0178007 A1 | 7/2009 | Matas et al. | |
| 2009/0209285 A1 * | 8/2009 | McMahan | 455/556.1 |
| 2009/0228842 A1 | 9/2009 | Westerman et al. | |
| 2009/0259969 A1 | 10/2009 | Pallakoff | |
| 2009/0262074 A1 * | 10/2009 | Nasiri et al. | 345/158 |
| 2009/0265671 A1 | 10/2009 | Sachs et al. | |
| 2009/0267896 A1 | 10/2009 | Hiramatsu | |
| 2010/0007618 A1 | 1/2010 | Park et al. | |
| 2010/0020025 A1 | 1/2010 | Lemort et al. | |
| 2010/0045705 A1 | 2/2010 | Vertegaal et al. | |
| 2010/0053095 A1 | 3/2010 | Wu et al. | |
| 2010/0053120 A1 | 3/2010 | Chang et al. | |
| 2010/0079493 A1 | 4/2010 | Tse et al. | |
| 2010/0083191 A1 | 4/2010 | Marshall | |
| 2010/0095234 A1 | 4/2010 | Lane et al. | |
| 2010/0103118 A1 | 4/2010 | Townsend et al. | |
| 2010/0123737 A1 | 5/2010 | Williamson et al. | |
| 2010/0127979 A1 | 5/2010 | Lee et al. | |
| 2010/0139990 A1 | 6/2010 | Westerman et al. | |
| 2010/0156941 A1 | 6/2010 | Seung | |
| 2010/0175018 A1 | 7/2010 | Petschnigg et al. | |
| 2010/0177121 A1 | 7/2010 | Homma et al. | |
| 2010/0188328 A1 | 7/2010 | Dodge et al. | |
| 2010/0194547 A1 | 8/2010 | Terrell et al. | |
| 2010/0214216 A1 | 8/2010 | Nasiri et al. | |
| 2010/0235729 A1 | 9/2010 | Kocienda et al. | |
| 2010/0281435 A1 | 11/2010 | Bangalore et al. | |
| 2010/0295781 A1 * | 11/2010 | Alameh et al. | 345/158 |
| 2010/0295799 A1 | 11/2010 | Nicholson et al. | |
| 2010/0298033 A1 | 11/2010 | Lee | |
| 2010/0306670 A1 | 12/2010 | Quinn et al. | |
| 2010/0328227 A1 | 12/2010 | Matejka et al. | |
| 2011/0115741 A1 | 5/2011 | Lukas et al. | |
| 2011/0163955 A1 * | 7/2011 | Nasiri et al. | 345/158 |
| 2011/0167357 A1 | 7/2011 | Benjamin et al. | |
| 2011/0187651 A1 * | 8/2011 | Whitlow et al. | 345/173 |
| 2011/0193788 A1 | 8/2011 | King et al. | |
| 2011/0197153 A1 | 8/2011 | King et al. | |
| 2011/0221777 A1 * | 9/2011 | Ke | 345/649 |
| 2011/0231796 A1 | 9/2011 | Vigil | |
| 2011/0239110 A1 | 9/2011 | Garrett et al. | |
| 2012/0092268 A1 | 4/2012 | Tsai et al. | |
| 2012/0092269 A1 | 4/2012 | Tsai et al. | |
| 2013/0335333 A1 | 12/2013 | Kukulski et al. | |

OTHER PUBLICATIONS

Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.

Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.

Ashbrook, et al., "MAGIC: A Motion Gesture Design Tool," retrieved at <<http://research.nokia.com/files/2010-Ashbrook-CHI10-MAGIC.pdf>>, Proceedings of the 28th International Conference on Human Factors in Computing Systems, Apr. 2010, 10 pages.

Hinckley, et al., "Foreground and Background Interaction with Sensor-Enhanced Mobile Devices," retrieved at <<http://research.microsoft.com/en-us/um/people/kenh/papers/tochisensing.pdf>>,

(56) References Cited

OTHER PUBLICATIONS

ACM Transactions on Computer-Human Interaction, vol. 12, No. 1, Mar. 2005, 22 pages.

Bartlett, Joel F., "Rock 'n' Scroll Is Here to Stay," accessed at <<http://www.hpl.hp.com/techreports/Compaq-DEC/WRL-2000-3.pdf>>, Western Research Laboratory, Palo Alto, California, May 2000, 9 pages.

Buxton, William, "Lexical and Pragmatic Considerations of Input Structure," retrieved at <<http://acm.org>>, ACM SIGGRAPH Computer Graphics, vol. 17, Issue 1, Jan. 1983, pp. 31-37.

Buxton, William, "Chunking and Phrasing and the Design of Human-Computer Dialogues," retrieved at <<http://www.billbuxton.com/chunking.pdf>>, Proceedings of the IFIP World Computer Congress, 1986, 9 pages.

Buxton, William, "A Three-State Model of Graphical Input," retrieved at <<http://www.billbuxton.com/3state.html>>, in D. Diaper, et al. (Eds), Human-Computer Interaction—INTERACT '90, Amsterdam: Elsevier Science Publishers B.V. (North-Holland), 8 pages.

Card, et al., "The Design Space of Input Devices," retrieved at <<http://acm.org>>, CHI '90 Proceedings of the SIGCHI Conference on Human factors in computing Systems, 1990, pp. 117-124.

Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, 2008, pp. 1779-1788.

Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mobile Devices and Services, 2007, pp. 190-197.

Chun, et al., "Virtual Shelves: Interactions with Orientation-Aware Devices," retrieved at <<http://acm.org>>, UIST'09, 2009, pp. 125-128.

Cohen, et al., "Synergistic Use of Direct Manipulation and Natural Language," retrieved at <<http://acm.org>>, CHI '89 Proceedings of the SIGCHI Conference on Human Factors in Computing Systems, 1989, pp. 227-233.

Eslambolchilar, et al., "Tilt-Based Automatic Zooming and Scaling in Mobile Devices—A State-Space Implementation," retrieved at <<http://eprints.gla.ac.uk/2951/1/tilt2_based.pdf>>, 6th International Symposium on Mobile Human-Computer Interaction, 2004, Sep. 2004, 13 pages.

Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.

Harrison, et al., "Squeeze Me, Hold Me, Tilt Me! An Exploration of Manipulative User Interfaces," retrieved at <<http://acm.org>>, CHI '98 Proceedings of the SIGCHI Conference on Human Factors in Computing Systems, pp. 17-24.

Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, pp. 205-208.

Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.

Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), 1978, pp. 210-216.

Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, pp. 451-460.

Hinckley, et al., "Sensing Techniques for Mobile Interaction," retrieved at <<http://acm.org>>, UIST'00 Proceedings of the 13th Annual ACM Symposium on User Interface Software and Technology, pp. 91-100.

Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, pp. 2793-2802.

Hudson, et al., "Whack Gestures: Inexact and Inattentive Interaction with Mobile Devices," retrieved at <<http://acm.org>>, TEI '10 Proceedings of the fourth International Conference on Tangible, Embedded, and Embodied Interaction, pp. 109-112.

Iwasaki, et al., "Expressive Typing: A New Way to Sense Typing Pressure and Its Applications," retrieved at <<http://acm.org>>, CHI '09 Proceedings of the 27th International Conference Extended Abstracts on Human Factors in Computing Systems, pp. 4369-4374.

Joshi, et al., "Image Deblurring using Inertial Measurement Sensors," retrieved at <<http://acm.org>>, ACM SIGGRAPH 2010, CHI 2009: Spotlight on Works in Progress—Session 2, pp. 4369-4374.

Kim, et al., "Hand Grip Pattern Recognition for Mobile User Interfaces," retrieved at <<http://www.aaai.org/Papers/IAAI/2006/IAAI06-013.pdf>>, IAAI'06 Proceedings of the 18th Conference on Innovative Applications of Artificial Intelligence, vol. 2, p. 1789-1794.

Kratz, et al., "Unravelling Seams: Improving Mobile Gesture Recognition with Visual Feedback Techniques," retrieved at <<http://acm.org>>, CHI '09 Proceedings of the 27th International Conference on Human Factors in Computing Systems, 2009, pp. 937-940.

Liao, et al., "Pacer: Fine-grained Interactive Paper via Camera-touch Hybrid Gestures on a Cell Phone," retrieved at <<http://acm.org>>, CHI '10 Proceedings of the 28th International Conference on Human Factors in Computing Systems, Apr. 2010, pp. 2441-2450.

Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, pp. 44-51.

Partridge, et al., "TiltType: Accelerometer-Supported Text Entry for Very Small Devices," retrieved at <<http://acm.org>>, UIST '02 Proceedings of the 15th Annual ACM Symposium on User Interface Software and Technology, 2002, pp. 201-204.

Rahman, et al., "Tilt Techniques: Investigating the Dexterity of Wrist-based Input," retrieved at <<http://acm.org>>, CHI '09 Proceedings of the 27th international Conference on Human Factors in Computing Systems, pp. 1943-1952.

Roudaut, et al., "TimeTilt: Using Sensor-Based Gestures to Travel through Multiple Applications on a Mobile Device," retrieved at << bencoenrico.free.fr/ENST/Home_files/roudaut_interactTime09. pdf >>, INTERACT '09, Proceedings of the 12th IFIP TC 13 International Conference on Human-Computer Interaction: Part I, 4 pages.

Schmidt, et al., "Advanced Interaction in Context," retrieved at <<http://citeseerx.ist.psu.edu/viewdoc/summary?doi=10.1.1.40. 2408 >>, HUC '99, Proceedings of the 1st International Symposium on Handheld and Ubiquitous Computing, 13 pages.

Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.

Schwesig, et al., "Gummi: A Bendable Computer," retrieved at <<http://acm.org>>, CHI '04, Proceedings of the SIGCHI Conference on Human Factors in Computing Systems, 2004, pp. 263-270.

Sellen, et al., "The Prevention of Mode Errors through Sensory Feedback," retrieved at <<http://acm.org>>, Journal of Human-Computer Interaction, vol. 7, Issue 2, Jun. 1992, pp. 141-161.

Taylor, et al., "Graspables: Grasp-Recognition as a User Interface," retrieved at <<http://acm.org>>, CHI '09 Proceedings of the 27th International Conference on Human factors in Computing Systems, Apr. 2009, pp. 917-925.

Wigdor, et al., "TiltText:Using Tilt for Text Input to Mobile Phones," retrieved at <<http://acm.org>>, UIST '03, Proceedings of the 16th Annual ACM Symposium on User Interface Software and Technology, 2003, pp. 81-90.

(56) References Cited

OTHER PUBLICATIONS

Williamson, et al., "Shoogle: Excitatory Multimodal Interaction on Mobile Devices," retrieved at <<http://acm.org>>, CHI '07, Proceedings of the SIGCHI Conference on Human factors in Computing Systems, 2007, pp. 121-124.
Hassan, et al., "Chucking: A One-Handed Document Sharing Technique," T. Gross et al. (Eds.): Interact 2009, Part II, LNCS 5727, 2009, pp. 264-278.
Rekimoto, Jen, "Tilting operations for small screen interfaces," UIST '96, Proceedings of the 9th Annual ACM Symposium on User Interface Software and Technology, 1996, 167-168.
Hinckley, et al., "Direct Display Interaction via Simultaneous Pen + Multi-touch Input," retrieved at <<http://lily.billbuxton.com/SID10%2038-2.pdf>>, Society for Information Display (SID) Symposium Digest of Technical Papers, vol. 41, No. 1, May 2010, pp. 537-540.
"DuoSense Pen, Touch & Multi-Touch Digitizer," retrieved at <<http://www.n-trig.com/Data/Uploads/Misc/DuoSense_Brochure_FINAL.pdf>>, N-trig Ltd., Kfar Saba, Israel, 4 pages.
"PenLab: Itronix GoBook Duo-Touch," retrieved at <<http://pencomputing.com/frames/itronix_duotouch.html>>, retrieved on Jun. 22, 2010, Pen Computing Magazine, 3 pages.
Babyak, Richard, "Controls & Sensors: Touch Tones", retrieved at <<http://www.appliancedesign.com/Articles/Controls_and_Displays/BNP_GUID_9-5-2006_A_100000000000000129366>>, Appliance Design, Jun. 30, 2007, 3 pages.
"International Search Report", Mailed Date: Jul. 31, 2012, Application No. PCT/US2011/065680, Filed Date: Dec. 17, 2011, pp. 13.
Joselli, et al., "gRmobile: A Framework for Touch and Accelerometer Gesture Recognition for Mobile Games", VIII Brazilian Symposium on Digital Games and Entertainment, IEEE, 2009, pp. 141-150.
"International Search Report", Mailed Date—Jul. 31, 2012, Application No. PCT/US2011/065595, Filed Date—Dec. 16, 2011, pp. 13.
Wigdor, et al., "Lucid Touch: a See-through Mobile Device," retrieved at <<http://acm.org>>, Proceedings of the 20th Annual ACM Symposium on User Interface Software and Technology, 2007, pp. 269-278.
Song, et al., "WYSIWYF: Exploring and Annotating Volume Data with a Tangible Handheld Device," retrieved at <<http://www.ntu.edu.sg/home/aswbgoh/publication/CHI2011_WYSIWF.pdf>>, Proceedings of the 2011 Annual Conference on Human Factors in Computing Systems, May 2011, 10 pages.
Ruiz, et al., "User-Defined Motion Gestures for Mobile Interaction," retrieved at <<http://yangl.org/pdf/motiongestures-chi2011.pdf>>, Proceedings of the 2011 Annual Conference on Human factors in Computing Systems, May 2011, 10 pages.
Dachselt, et al., "Throw and Tilt—Seamless Interaction across Devices Using Mobile Phone Gestures," retrieved at <<http://isgwww.cs.uni-magdeburg.de/uise/Forschung/Publikationen/2009-MEIS-Throw-and-Tilt.pdf>>, Proceedings of 34th Graphics Interface Conference, May 2008, 7 pages.
Hinckley, et al., "Sensor Synaesthesia: Touch in Motion, and Motion in Touch," retrieved at <<http://research.microsoft.com/en-us/um/people/kenh/all-published-papers/sensor-synaesthesia-chi-2011.pdf>>, Proceedings of the 2011 Annual Conference on Human Factors in Computing Systems, May 2011, 10 pages.
Hinckley, et al., U.S. Appl. No. 13/327,794, filed Dec. 16, 2011, entitled "Gesture Combining Multi-Touch and Movement," 53 pages.
Hinckley, et al., U.S. Appl. No. 12/970,945, filed Dec. 17, 2010, entitled "Detecting and Responding to Unintentional Contact With a Computing Device," 47 pages.
Hinckley, et al., U.S. Appl. No. 12/970,949, filed Dec. 17, 2010, entitled "Cooperative Use of Plural Input Mechanisms to Convey Gestures," 46 pages.
Hinckley, et al., U.S. Appl. No. 12/970,939, filed Dec. 17, 2010, entitled "Detecting Gestures Involving Intentional Movement of a Computing Device," 68 pages.
Hinckley, et al., U.S. Appl. No. 12/970,955, filed Dec. 17, 2010, entitled "Supplementing a Touch Input Mechanism With Fingerprint Detection," 40 pages.
Hinckley, et al., U.S. Appl. No. 13/367,377, filed Feb. 7, 2012, entitled "Multi-Touch-Movement Gestures for Tablet Computing Devices," 64 pages.
Döring, et al., "Exploring Gesture-Based Interaction Techniques in Multi-Display Environments with Mobile Phones and a Multi-Touch Table," retrieved at <<http://www.sahami.org/papers/20101ppd_10.pdf>>, Proceedings of the Workshop on Coupled Display Visual Interfaces, May 25, 2010, pp. 47-54.
"N-act Multi-Touch Gesture Vocabulary Set," retrieved at <<http://www.n-trig.com/Content.aspx?Page=Nact>>, retrieved on Oct. 12, 2011, N-trig, Kfar Saba, Israel, 1 page.
Savov, Vlad, "Samsung Galaxy S II Shows Off Motion-Zoom Option in TouchWiz 4.0 (Video)," retrieved at <<http://www.engadget.com/2011/03/29/samsung-galaxy-s-ii-shows-off-gyro-zoom-option-in-touchwiz-4-0/>>, retrieved on Oct. 13, 2011, Engadget, AOL Tech., AOL, Inc., Vienna, VA, posted Mar. 29, 2011, 3 pages.
"Samsung Exhibit II 4G review: Second time around," retrieved at <<http://www.gsmarena.com/samsung_exhibit_2_4g-review-685p5.php>>, GSMArena.com, Dec. 1, 2011, p. 5 of online article, 3 pages.
Aliakseyeu, D., A. Lucero, S. Subramanian, Interacting with piles of artifacts on digital tables, Digital Creativity, Jul. 2007, pp. 161-174, vol. 18, No. 3.
Balakrishnan, et al., "The Rockin' Mouse: Integral 3D Manipulation on a Plane", In Proceedings of the ACM SIGCHI Conference on Human Factors in Computing Systems, Mar. 22, 1997, 8 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.
Bi, et al., "An Exploration of Pen Rolling for Pen-Based Interaction", In Proceedings of the 21st Annual ACM Symposium on User Interface Software and Technology, Oct. 19, 2008, 10 pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.
Fitzmaurice, et al., "Tracking Menus", In Proceedings of the 16th Annual ACM Symposium on User Interface Software and Technology, Nov. 2, 2003, 10 pages.
Frisch, et al., "Investigating Multi-Touch and Pen Gestures for Diagram Editing on Interactive Surfaces", In ACM International Conference on Interactive Tabletops and Surfaces, Nov. 23, 2009, 8 pages.
Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.
Hinckley, et al., "Pen + Touch = New Tools", In Proceedings of the 23nd Annual ACM Symposium on User Interface Software and Technology, Oct. 3, 2010, 10 pages.
Hinckley, Ken, "Synchronous Gestures for Multiple Persons and Computers", In Proceedings of the 16th Annual ACM Symposium on User Interface Software and Technology, Nov. 2, 2003, 10 pages.
Hinckley, et al., "Touch-Sensing Input Devices", In Proceedings of the SIGCHI Conference on Human Factors in Computing Systems, May 15, 1999, 8 pages.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.
Izadi, et al., "C-Slate: A Multi-Touch and Object Recognition System for Remote Collaboration using Horizontal Surfaces", Second Annual IEEE International Workshop on Horizontal Interactive Human-Computer System, Oct. 2007, pp. 3-10.
Kendrick, "ChromeTouch: Free Extension for Touch Tables", GigaOM, May 6, 2010, 9 pages.

(56) References Cited

OTHER PUBLICATIONS

Kurtenbach, et al., "Issues in Combining Marking and Direct Manipulation Techniques", In Proceedings of the 4th Annual ACM Symposium on User Interface Software and Technology, Nov. 11, 1991, 8 pages.

Lester, et al., ""Are You With Me?"—Using Accelerometers to Determine if Two Devices are Carried by the Same Person", In Proceedings of Second International Conference on Pervasive Computing, Apr. 21, 2004, 18 pages.

Li, et al., "Experimental Analysis of Mode Switching Techniques in Pen-Based User Interfaces", In Proceedings of the SIGCHI Conference on Human Factors in Computing Systems, Apr. 2, 2005, 10 pages.

Mohamed, et al., "Disoriented Pen-Gestures for Identifying Users Around the Tabletop Without Cameras and Motion Sensors", Proceedings of the First IEEE International Workshop on Horizontal Interactive Human-Computer Systems (Tabletop '06), Jan. 2006, 8 pages.

Mulroy, "N-Trig Pushes Pen and Multitouch Input", PC World, retrieved on Jan. 27, 2011 at <<http://www.pcworld.com/artide/196723/ntrig_pushes_pen_and_multitouch_input.html>>, May 19, 2010, 3 pages.

Ramos, et al., "Pressure Widgets", In Proceedings of the SIGCHI Conference on Human Factors in Computing Systems, vol. 6, Issue 1, Apr. 24, 2004, 8 pages.

Ramos, et al., "Tumble! Splat! Helping Users Access and Manipulate Occluded Content in 2D Drawings", In Proceedings of the Working Conference on Advanced Visual Interfaces, May 23, 2006, 8 pages.

Sachs, et al., "3-Draw: A Tool for Designing 3D Shapes", In Journal of IEEE Computer Graphics and Applications, vol. 11, Issue 6, Nov. 1991, 9 pages.

Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.

Subramanian, et al., "Multi-layer interaction for digital tables," In Proc. of the 19th Annual ACM Symposium on User Interface Software and Technology, Oct. 15, 2006, pp. 269-272.

Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.

Thurott, Paul, "Windows XP Tablet PC Edition reviewed", Paul Thurrott's Supersite for Windows, Jun. 25, 2002, 7 pages.

Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.

Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.

"TouchPaint.java", The Android Open Source Project, 2007.

"Using Windows Flip 3D", retrieved at <<http://windows.microsoft.com/en-US/windows-vista/Using-Wndows-Flip-3D>>, retrieved on Feb. 9, 2012, Microsoft Corporation, Redmond, WA, 1 page.

Verplaetse, C., "Inertial Proprioceptive Devices: Self-Motion-Sensing Toys and Tools", In IBM Systems Journal, vol. 35, Issue 3-4, Apr. 23, 2013, 12 pages.

Walker, Geoff, "Palm rejection on resistive touchscreens", Veritas et Visus, Nov. 2005, pp. 31-33.

Wilson, et al., "XWand: UI for Intelligent Spaces", In Proceedings of the SIGCHI Conference on Human Factors in Computing Systems, Apr. 5, 2003, 8 pages.

Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.

Yee, Ka-Ping, "Two-Handed Interaction on a Tablet Display", In Proceedings of Extended Abstracts on Human Factors in Computing Systems, Apr. 24, 2004, 4 pages.

Zelenik, et al., "Hands-On Math: A Page-Based Multi-Touch and Pen Desktop for Technical Work and Problem Solving", In Proceedings of the 23nd Annual Symposium on User Interface Software and Technology, Oct. 3, 2010, 10 pages.

Ilya Traktovenko, U.S. Office Action, U.S. Appl. No. 12/970,945, Apr. 22, 2013.

Figueroa-Gibson, G., U.S. Office Action, U.S. Appl. No. 12/970,939, Jun. 5, 2013.

Figueroa-Gibson, G., U.S. Office Action, U.S. Appl. No. 12/970,939, Aug. 22, 2013.

Traktovenko, Ilya, U.S. Notice of Allowance, U.S. Appl. No. 12/970,945, Jul. 10, 2013.

Figueroa-Gibson, G., U.S. Office Action, U.S. Appl. No. 12/970,949, Jun. 21, 2013.

Treitler, D., U.S. Office Action, U.S. Appl. No. 13/327,794, Aug. 16, 2013.

Zhou, Hong, U.S. Office Action, U.S. Appl. No. 13/026,058, Aug. 29, 2013.

Traktovenko, Ilya, U.S. Notice of Allowance, U.S. Appl. No. 12/970,945, Oct. 16, 2013.

Figueroa-Gibson, Gloryvid, U.S. Final Office Action, U.S. Appl. No. 12/970,949, Nov. 29, 2013, pp. 1-29.

Figueroa-Gibson, Gloryvid, U.S. Office Action, U.S. Appl. No. 12/970,939, Dec. 19, 2013, pp. 1-28.

Zhou, Hong, U.S. Final Office Action, U.S. Appl. No. 13/026,058, Feb. 26, 2014, pp. 1-14.

Treitler, Damon, U.S. Final Office Action, U.S. Appl. No. 13/327,794, Dec. 19, 2013, pp. 1-16.

"First Office Action and Search Report Received in Chinese Patent Application No. 201110427737.8", Mailed Date: Mar. 28, 2014, Filed Date: Dec. 19, 2011, 19 Pages.

Traktovenko, Ilya, U.S. Final Office Action, U.S. Appl. No. 13/530,015, Nov. 19, 2014, pp. 1-48.

Zhou, Hong, Notice of Allowance, U.S. Appl. No. 13/026,058, Nov. 7, 2014, pp. 1-5.

Treitler, Damon, U.S. Final Office Action, U.S. Appl. No. 13/327,794, Nov. 20, 2014, pp. 1-13.

Balakrishnan, et al., Digital tape drawing, Proceedings of the 12th Annual ACM Symposium on User Interface Software and Technology, ACM Symposium on User Interface Software and Technology, UIST '99, Nov. 7-10, 1999, pp. 161-169, Asheville, USA.

Brandl, et al., "Occlusion-aware menu design for digital tabletops", Proc. of the 27th Int'l Conf. on Human Factors in Computing Systems, CHI 2009, Extended Abstracts, Apr. 4-9, 2009, pp. 3223-3228, Boston, MA, USA.

Buxton, W., "Integrating the Periphery and Context: A New Model of Telematics Proceedings of Graphics Interface", 1995, pp. 239-246.

Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.

Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.

Guiard, et al., "Writing Postures in Left-Handers: Inverters are Hand-Crossers", Neuropsychologia, Mar. 1984, pp. 535-538, vol. 22, No. 4.

Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.

Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.

Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.

(56) References Cited

OTHER PUBLICATIONS

Luff, et al., Mobility in Collaboration, Proceedings of the ACM 1998 Conference on Computer Supported Cooperative Work, CSCW 1998, Nov. 14-18, 1998, pp. 305-314, Seattle, WA, USA.

Mahony, et al., Nonlinear Complementary Filters on the Special Orthogonal Group, IEEE Trans. Automat. Contr., 2008, pp. 1203-1218, vol. 53, No. 5.

Mason, et al., "Grip Forces When Passing an Object to a Partner", Exp. Brain Res., May 2005, vol. 163, No. 2, pp. 173-187.

Premerlani, et al., Direction Cosine Matrix IMU: Theory, retrieved from gentlenav.googlecode.com/files/DCMDraft2.pdf, May 2009, pp. 1-30.

Siio, et al., "Mobile Interaction Using Paperweight Metaphor", Proc. of the 19th Annual ACM Symposium on User Interface Software and Technology, UIST '06, Oct. 2006, pp. 111-114, Montreux, Switzerland.

Wimmer, et al., HandSense: Discriminating Different Ways of Grasping and Holding a Tangible User Interface, Proceedings of the 3rd International Conference on Tangible and Embedded Interaction, TEI '09, Feb. 2009, pp. 359-362, Cambridge, UK.

Traktovenko, Ilya, U.S. Office Action, U.S. Appl. No. 13/530,015, Jul. 18, 2014, pp. 1-26.

Figueroa-Gibson, Gloryvid, U.S. Office Action, U.S. Appl. No. 12/970,949, Mar. 13, 2014, pp. 1-29.

Figueroa-Gibson, Gloryvid, U.S. Final Office Action, U.S. Appl. No. 12/970,949, Aug. 15, 2014, pp. 1-21.

Figueroa-Gibson, Gloryvid, U.S. Final Office Action, U.S. Appl. No. 12/970,939, May 30, 2014, pp. 1-32.

Figueroa-Gibson, Gloryvid, U.S. Office Action, U.S. Appl. No. 12/970,939, Oct. 2, 2014, pp. 1-40.

Zhou, Hong, Notice of Allowance, U.S. Appl. No. 13/026,058, Jul. 17, 2014, pp. 1-5.

Treitler, Damon, U.S. Office Action, U.S. Appl. No. 13/327,794, Jul. 17, 2014, pp. 1-13.

Geisy, Adam, U.S. Office Action, U.S. Appl. No. 13/367,377, Feb. 13, 2014, pp. 1-11.

Geisy, Adam, U.S. Final Office Action, U.S. Appl. No. 13/367,377, Jul. 1, 2014, pp. 1-12.

Geisy, Adam, Notice of Allowance, U.S. Appl. No. 13/367,377, Oct. 27, 2014, pp. 1-10.

* cited by examiner

USING MOVEMENT OF A COMPUTING DEVICE TO ENHANCE INTERPRETATION OF INPUT EVENTS PRODUCED WHEN INTERACTING WITH THE COMPUTING DEVICE

BACKGROUND

Handheld computing devices often allow users to input information by making direct contact with the display surfaces of the devices. These types of input mechanisms are referred to as contact-type input mechanisms herein. For instance, a touch input mechanism provides direct touch input events when a user touches a display surface of the computing device with a finger (or multiple fingers). A pen input mechanism provides direct pen input events when a user touches the display surface with a pen device, also known as a stylus.

Computing devices also permit a user to perform gestures by using one or more fingers or a pen device. For example, a gesture may correspond to a telltale mark that a user traces on the display surface with a finger or pen input device. The computing device correlates this gesture with an associated command. The computing device then executes the command. Such execution can occur in the course of the user's input action (as in direct-manipulation drag actions), or after the user finishes the input action.

Generally, a developer may wish to provide an expressive contact-type input mechanism that accommodates a rich set of input gestures. However, increasing the number of gestures may introduce a number of challenges. For instance, assume that a computing device accommodates two or more pre-defined intentional gestures that are nonetheless similar. In this case, the user may intend to enter a particular gesture, but the computing device may mistakenly interpret that gesture as another, but similar, gesture. In another case, the user may seek to perform a task using the computing device that does not involve intended interaction with a contact-type input mechanism. Yet the user may handle the computing device in a manner which causes inadvertent contact with the contact-type input mechanism. Or the user may accidently brush or bump against the display surface of the contact-type input mechanism while inputting information, which causes accidental contact with the contact-type input mechanism. The contact-type input mechanism may incorrectly interpret these accidental contacts as legitimate input events. These problems may understandably frustrate the user if they become a frequent occurrence, or, even if uncommon, if they cause significant disruption in the task that the user is performing.

A developer can address some of these concerns by developing compound idiosyncratic gestures. However, this is not a fully satisfactory solution because the user may have difficulty remembering and executing these gestures, particularly when these gestures are complex and "unnatural." Furthermore, complex gestures often take longer for the user to articulate. For this reason, adding these types of gestures to a set of possible gestures yields diminishing returns.

SUMMARY

A computing device is described herein which collects plural input events that describe an input action. For instance, the computing device receives one or more input events from at least one contact-type input mechanism, such as a touch input mechanism and/or a pen input mechanism. The computing device also receives one or more input events from at least one movement-type input mechanism, such as an accelerometer and/or gyro device. The movement-type input mechanism indicates the orientation or dynamic motion of the computing device. (More specifically, as used herein, the term "movement" broadly encompasses either orientation of the computing device or the dynamic motion of the computing device, or both). Based on these input events, optionally in conjunction with other factors, the computing device interprets the type of the input action that has occurred. And based on this detection, the computing device can then execute a desired behavior, such as ignoring at least part of the input events.

More briefly stated, described herein is a computing device that takes the movement of the computing device into account when interpreting the intentional or unintentional contact-type inputs of the user (via a touch and/or pen input mechanism). The movements are characterized as background movements insofar as they are incidental to any goal-directed behavior currently exhibited by the user (if any). That is, the user may not be focused on performing these background movements as an intentional act.

In one case, the computing device is configured to repeatedly analyze input events received from the contact-type input mechanism(s) and the movement-type input mechanism(s) in a course of the input action. This is performed to improve a level of confidence at which the computing device detects the type of input action.

The Detailed Description sets forth numerous scenarios in which the movement of the computing device is used to refine an analysis of contact input event(s). Some of these examples are summarized below.

In one scenario, the computing device concludes that at least part of the input action is unintentional when the movement input event(s) exceed a prescribed threshold over a prescribed time window. In this case, the input action may be associated with picking up or setting down the computing device.

In another scenario, the computing device concludes that at least part of the input action is unintentional when movement input event(s) exhibit noise-like motion characteristics indicative of operation of the computing device in a noisy environment.

In another scenario, the computing device concludes that at least part of the input action is unintentional due to unintentional movement that occurs during application or removal of a touch contact.

In another scenario, the computing device more accurately discriminates a type of gesture that has been performed based on a combination of contact input event(s) and movement input event(s).

In another example, the computing device concludes that the input action is associated with an unintentional application of a finger or other hand part when the movement input event(s) indicate that the computing device is being held upright in a hand, which, in turn, can be detected by determining the orientation of the computing device.

The computing device can perform various behaviors in response to its analysis. In one case, the computing device can reject at least part of the contact input event(s) when the computing device determines that at least part of the input action is unintentional. In addition, or alternatively, the computing device can restore a pre-action state when the computing device determines that at least part of the input action is unintentional. In addition, or alternatively, the computing device can correct an interpretation of contact input event(s) to remove effects of the movement input event(s) when the computing device determines that at least part of the input action is unintentional. In addition, or alternatively, the computing device can modify a user interface presentation based on a type of input action that has been detected.

The above functionality can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing device that takes the movement of the computing device into account when assessing contact input events. Section B describes illustrative methods which explain the operation of the computing device of Section A. Section C describes illustrative processing functionality that can be used to implement any aspect of the features described in Sections A and B.

This application is related to commonly-assigned patent application Ser. No. 12/970,939, entitled, "Detecting Gestures Involving Intentional Movement of a Computing Device," naming the inventors of Kenneth Hinckley, et al., and filed on the same date as the instant application. That application is incorporated by reference herein in its entirety.

Figure 21:
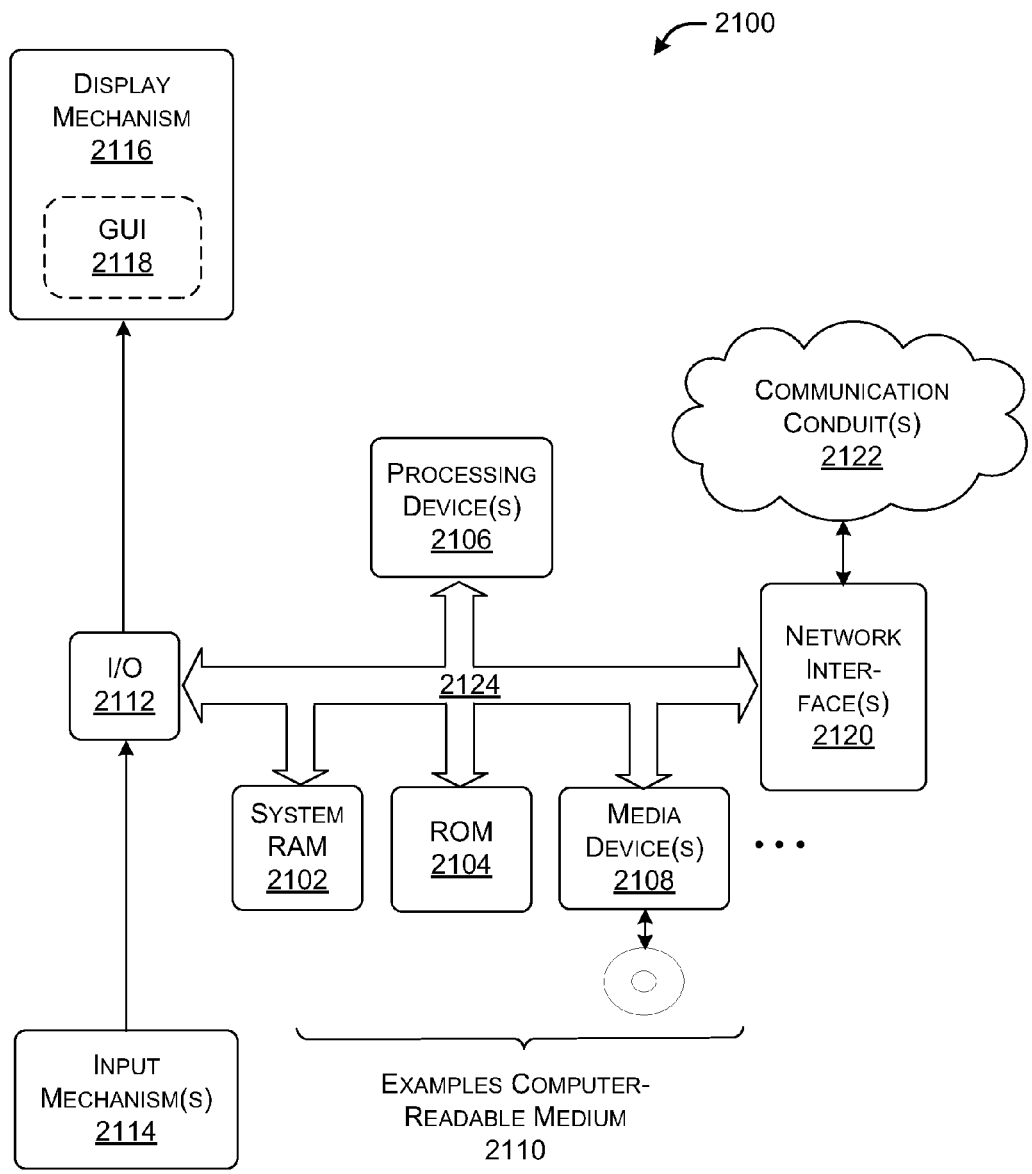
FIG. 21 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (such as by hardware, software, firmware, etc., or any combination thereof). In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 21, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (such as by hardware, software, firmware, etc., or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may identify a single instance of a feature, or plural instances of a feature. Recitation of a single instance of a feature does not preclude plural instances of this feature; further, recitation of plural instances does not preclude a singular instance of this feature. Finally, the terms "exemplary" or "illustrative" refer to one implementation among potentially many implementations.

A. Illustrative Computing Devices

A.1. Overview

Figure 1:
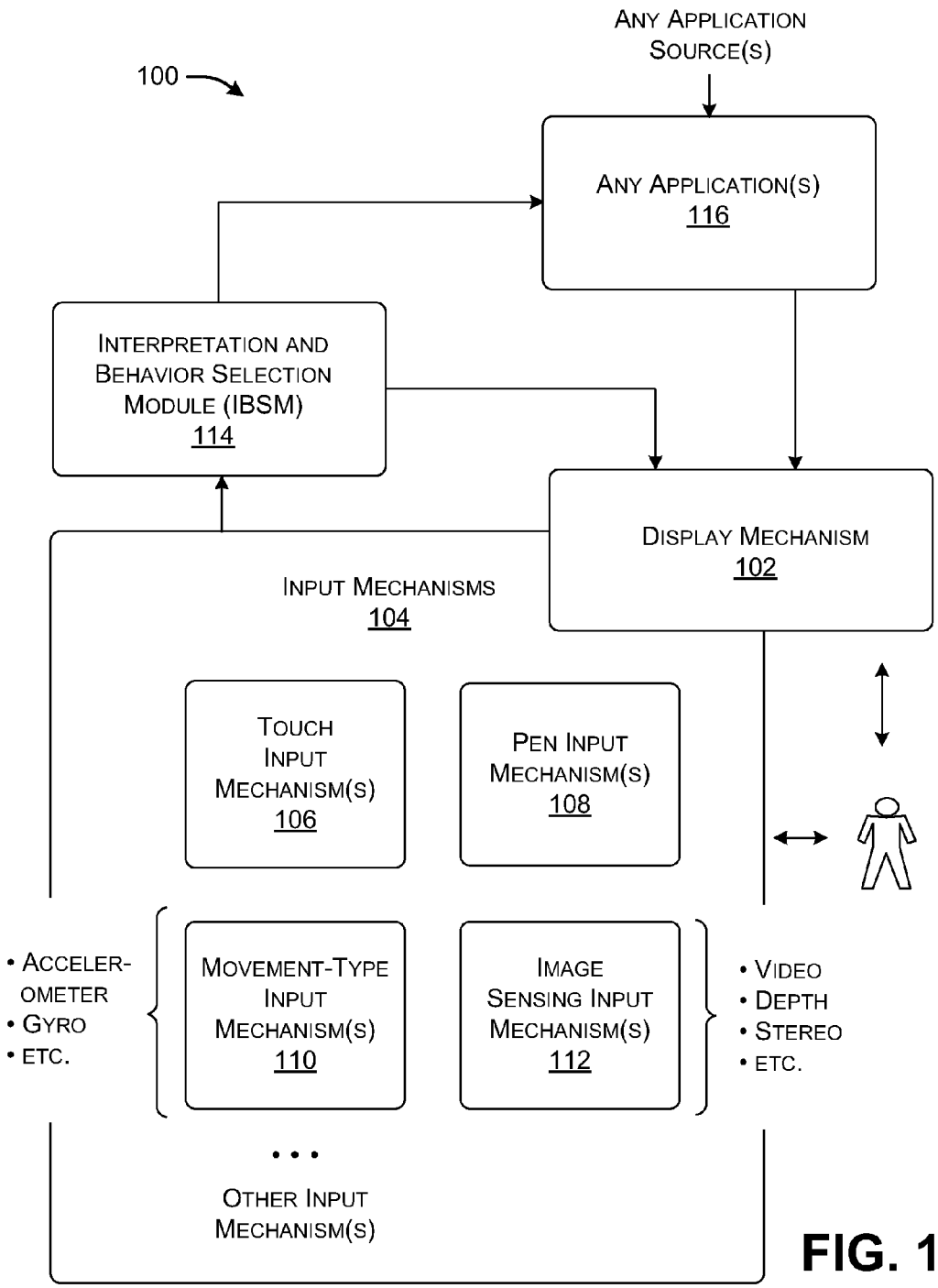
FIG. 1 shows an illustrative computing device that includes functionality for interpreting contact input events in the context of movement input events, and/or for interpreting movement input events in the context of contact input events.

FIG. 1 shows an example of a computing device 100 that takes into account movement of the computing device 100 when analyzing contact input events. The computing device 100 optionally includes a display mechanism 102 in conjunction with various input mechanisms 104. If included, the display mechanism 102 provides a visual rendering of digital information on a display surface. The display mechanism 102 can be implemented by any type of display, such as a liquid crystal display, etc. Although not shown, the computing device 100 can also include an audio output mechanism, a haptic (e.g., vibratory) output mechanism, etc.

The input mechanisms 104 can include touch input mechanism(s) 106 and pen input mechanism(s) 108. The touch input mechanism(s) 106 can be implemented using any technology, such as resistive touch screen technology, capacitive touch screen technology, acoustic touch screen technology, bi-directional touch screen technology, and so on. In bi-directional touch screen technology, a display mechanism provides elements devoted to displaying information and elements devoted to receiving information. Thus, a surface of a bi-directional display mechanism is also a capture mechanism. The touch input mechanism(s) 106 and the pen input mechanism(s) 108 can also be implemented using a pad-type input mechanism that is separate from (or at least partially separate from) the display mechanism 102. A pad-type input mechanism is also referred to as a tablet, a digitizer, a graphics pad, etc.

The pen input mechanism(s) 108 can be implemented using any technology, such as passive pen technology, active pen technology, and so on. In the passive case, the computing device 100 detects the presence of the pen device when it touches (or is proximal to) the display surface. In that case, the pen device may represent simply an elongate implement having no independent power source and no processing functionality, or it may be passively powered by inductive coupling with the display mechanism 102. In the active case, the pen device can incorporate independent detection functionality for sensing its position with respect to the display surface. Further, the active pen device can include independent movement sensing mechanisms. Further, the active pen device can include independent depth sense mechanisms. In these examples, the active pen device can forward its input data to the computing device 100 for analysis. In the following description, it is to be understood that input data regarding the pen device can originate from the computing device 100, the pen device itself, or a combination thereof.

In the terminology used herein, a contact-type input mechanism describes any type of input mechanism in which the user establishes actual or close contact with a display surface of the display mechanism 102 or other part of the computing device 102. Contact-type input mechanisms include the above-described touch input mechanism(s) 106 and the pen input mechanism(s) 108, etc. Further, any contact with the computing device 100 may include one or more instances of separate contact. For example, a user can make contact with the display surface by placing one or more fingers in proximal or actual contact with the display surface.

The input mechanisms 104 also include various types of movement-type input mechanism(s) 110. The term movement-type input mechanism describes any type of input mechanism that measures the orientation or motion of the computing device 100, or both. The movement type input mechanism(s) 110 can be implemented using linear accelerometers, gyroscopic sensors ("gyro devices" according to the terminology used herein), vibratory sensors tuned to various motion frequency bandwidths, mechanical means to detect specific postures or movements of the computing device 100 or parts of the computing device 100 relative to gravity, torque sensors, strain gauges, flex sensors, optical encoder mechanisms, and so on. Furthermore, any movement-type input mechanism can sense movement along any number of spatial axes. For example, the computing device 100 can incorporate an accelerometer and/or a gyro device that measures movement along three spatial axes.

The input mechanisms 104 also can include any type of image sensing input mechanism(s) 112, such as a video capture input mechanism, a depth sensing input mechanism, a stereo image capture mechanism, and so on. The depth sensing input mechanism measures the distance of objects from some part of the computing device 100. For example, in one case, the depth sensing input mechanism measures the distance of objects from the display surface of the computing device 100. The depth sensing input mechanism can be implemented using any type of capture technology (e.g., time-of-flight technology) in conjunction with any type of electromagnetic radiation (e.g., visible spectrum radiation, infrared spectrum radiation, etc.). Some of the image sensing input mechanism(s) 112 can also function as movement-type input mechanisms, insofar as they can be used to determine movement of the computing device 100 relative to the surrounding environment. Alternatively, or in addition, some of the image sensing input mechanism(s) 112 can be used in conjunction with the movement-type input mechanism(s) 110, e.g., to enhance the performance and/or accuracy of the movement-type input mechanism(s) 110. Although not specifically enumerated in FIG. 1, other input mechanisms can include a keypad input mechanism, a mouse input mechanism, a voice input mechanism, and so on.

In the terminology used herein, each input mechanism is said to generate an input event when it is invoked. For example, when a user touches the display surface of the display mechanism 102 (or other part of the computing device 100), the touch input mechanism(s) 106 generates touch input events. When the user applies a pen device to the display surface, the pen input mechanism(s) 108 generates pen input events. More generally stated, a contact-type input mechanism generates contact input events, which indicate the proximal or actual physical contact of some object with the computing device 100. A movement-type input mechanism, by contrast, is said to generate movement input events. Any input event may itself include one or more input event components. For ease and brevity of reference, the following explanation will most often describe the output of an input mechanism in the plural, e.g., as "input events." However, various analyses can also be performed on the basis of a singular input event.

FIG. 1 depicts the input mechanisms 104 as partially overlapping the display mechanism 102. This is because at least some of the input mechanisms 104 may be integrated with functionality associated with the display mechanism 102. This is the case with respect to the contact-type input mechanisms, such as the touch input mechanism(s) 106 and the pen input mechanism 108(s). For example, the touch input mechanism(s) 106 relies, in part, on functionality provided by the display mechanism 102.

An interpretation and behavior selection module (IBSM) 114 receives input events from the input mechanisms 104. Namely, it collects the input events over the course of an input action, where that input action is either deliberate or unintentional, or a combination thereof. As the name suggests, the IBSM 114 performs the task of interpreting the input events.

In doing so, it interprets contact input events in the context of movement input events (and vice versa), optionally in conjunction with other factors. After performing its interpretation role, the IBSM 114 may perform behavior associated with zero, one, or more of the interpreted input events.

From a high-level perspective, the IBSM 114 performs two roles, depending on the nature of movement that occurs during the input action. In a first role, the IBSM 114 analyzes both contact input events and movement input events to determine whether the user has deliberately moved the computing device 100 as part of an intentional gesture. If so, the IBSM 114 recognizes the gesture and executes whatever behavior is mapped to the gesture. In this context, the movement that occurs is foreground movement because the user intentionally performs this action; namely, it is in the foreground of the user's focus of awareness.

More specifically, in a first case, the IBSM 114 executes a behavior at the completion of a gesture. In a second case, the IBSM 114 executes a behavior over the course of the gesture. In any case, the IBSM 114 can also interpret two or more gestures that happen simultaneously and/or in succession, and execute commensurate behaviors associated with the gestures. In any case, the IBSM 114 can also continue to analyze the type of gesture that has occurred (or is presently occurring), and revise its interpretation of that gesture as deemed appropriate. Examples will follow clarify these aspects of the IBSM 114.

In a second role, the IBSM 114 analyzes both contact input events together with movement input events, where the movement input events are attributed to background movement of the computing device 100. The movement is background in the sense that it is in the background of the user's awareness. The movement may be incidental to any goal-directed input behavior of the user (if any). In this case, the IBSM 114 attempts to interpret the type of input action associated with the input events, e.g., to determine whether the contact with the display surface is intentional or unintentional. The IBSM 114 can then perform various behaviors in response to its analysis.

Section A.2 (below) provides additional details regarding the foreground mode of operation while Section A.3 (below) provides additional details regarding the background mode of operation. Although many of the examples set forth the use of touch input in conjunction with movement input events, any of these examples also apply to the use of pen input (or any other contact input) in conjunction with movement input events.

Finally, the computing device 100 may run one or more applications 116 received from any application source or sources. The applications 116 can provide any higher-level functionality in any application domain.

In one case, the IBSM 114 represents a separate component with respect to applications 116. In another case, one or more functions attributed to the IBSM 114 can be performed by one or more applications 116. For example, in one implementation, the IBSM 114 can interpret a gesture that has been performed, while an application can select and execute behavior that is based on that interpretation. Accordingly, the concept of the IBSM 114 is to be interpreted liberally herein as encompassing functions that can be performed by any number of components within a particular implementation.

Figure 2:
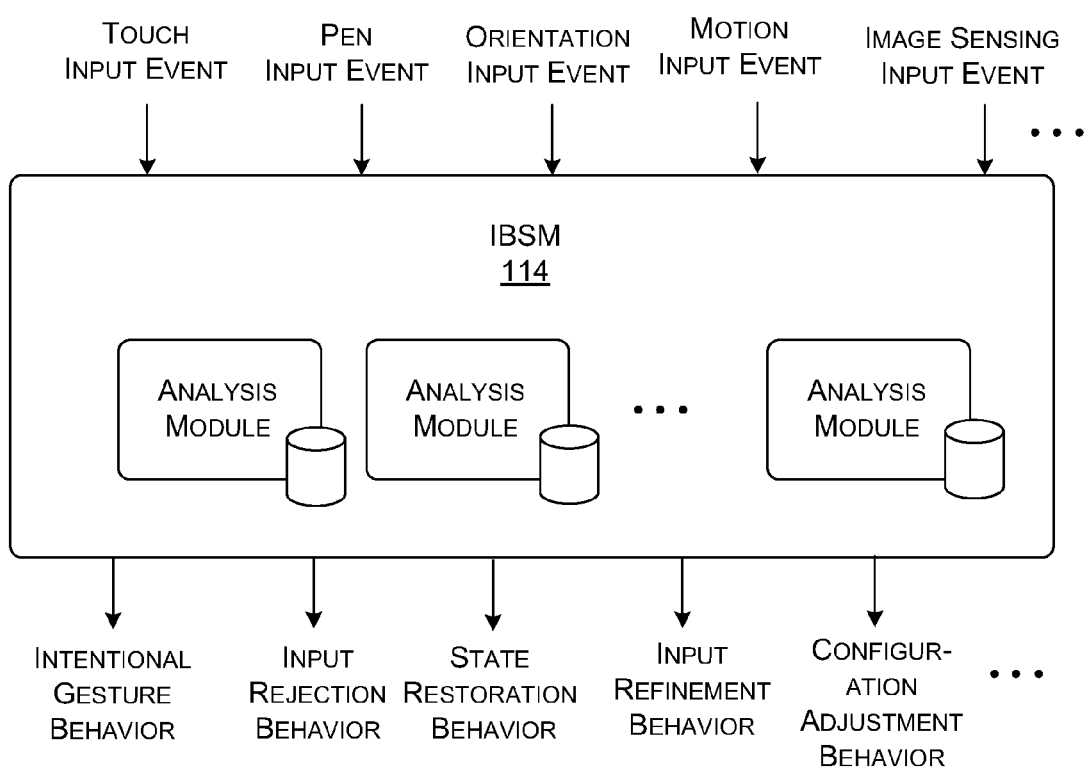
FIG. 2 shows an interpretation and behavior selection module (IBSM) used in the computing device of FIG. 1.

FIG. 2 shows another depiction of the IBSM 114 introduced in FIG. 1. As shown there, the IBSM 114 receives various input events. For example, the IBSM 114 can receive touch input events, pen input events, orientation input events, motion input events, image sensing input events, and so on. In response to these events, the IBSM 114 provides various output behaviors. For example, the IBSM 114 can execute various commands in response to detecting an intentional motion-based gesture. Depending on environment-specific factors, the IBSM 114 can perform these functions in the course of the user's performance of the gesture and/or upon the completion of the gesture. The IBSM 114 can also provide various visual, audible, haptic, etc. feedback indicators to indicate its present interpretation of the gesture that has most likely been (or is being) performed. Alternatively, or in addition, the IBSM 114 can reject part of the contact input events if it determines that an input action was unintentional, at least in part. Alternatively, or in addition, the IBSM 114 can restore a state (such as a display state and/or an application state) to a point prior to the occurrence of an input action. Alternatively, or in addition, the IBSM 114 can correct an interpretation of the contact input events to remove effects of the movement input events when the IBSM 114 determines that at least part of the input action is unintentional. Alternatively, or in addition, the IBSM 114 can adjust the configuration of the computing device 100 in any way based on its understanding of the input action, e.g., so as to more efficiently receive further intentional contact input events and minimize the impact of unintentional contact input events. Alternatively, or in addition, the IBSM 114 can modify or remove the above-described feedback indicators based on its present interpretation of the input events, e.g., insofar the present interpretation may differ from a preceding interpretation.

To function as described, the IBSM 114 can incorporate a suite of analysis modules, where the detection of different gestures and background motion scenarios may rely on different respective analysis modules. Any analysis module can rely on one or more techniques to classify the input events, including pattern-matching techniques, rules-based techniques, statistical techniques, and so on. For example, each gesture or background noise scenario can be characterized by a particular telltale pattern of inputs events. To classify a particular sequence of input events, a particular analysis module can compare those input events against a data store of known patterns. Representative features that may help to distinguish a gesture or background scenario include the manner in which a contact is applied and then removed, the manner in which the contact is moved while being applied (if it all), the magnitude of the movement input events, the particular signal shapes and other characteristics of the movement input events, and so on. And as noted above, an analysis module can continually test its conclusions with respect to new input events that arrive.

Figure 3:
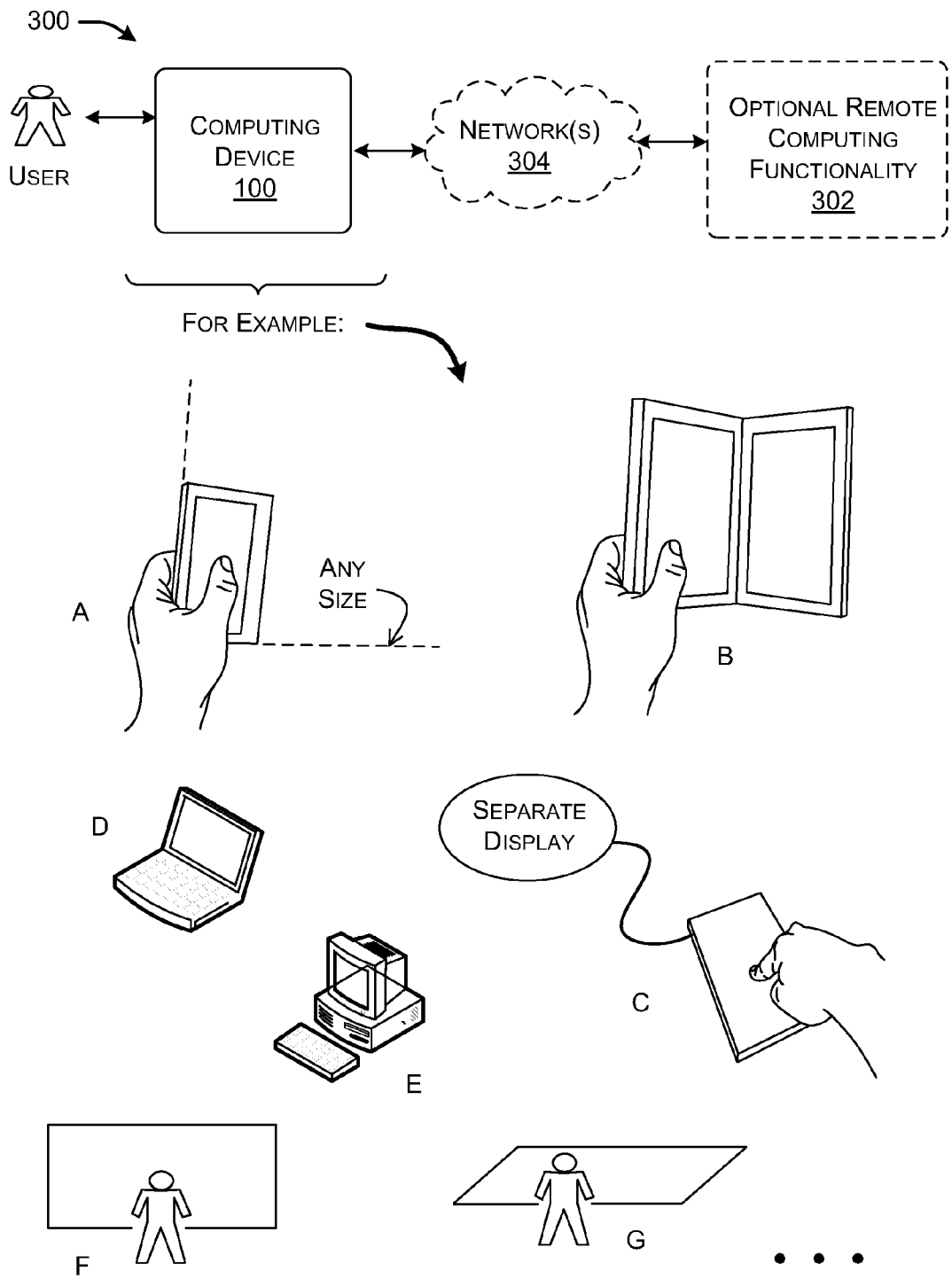
FIG. 3 shows an illustrative system in which the computing device of FIG. 1 can be used.

FIG. 3 shows an illustrative system 300 in which the computing device 100 of FIG. 1 can be used. In this system 300, a user interacts with the computing device 100 to provide input events and receive output information. The computing device 100 can be physically implemented as any type of device, including any type of handheld device as well as any type of traditionally stationary device. For example, the computing device 100 can be implemented as a personal digital assistant, a mobile communication device, a pad-type device, a book reader device, a handheld game device, a laptop computing device, a personal computer device, a work station device, a game console device, a set-top box device, and so on. Further, the computing device 100 can include one or more device parts, some (or all or none) of which may have display surface parts.

FIG. 3 depicts a representative (but non-exhaustive) collection of implementations of the computing device 100. In scenario A, the computing device 100 is a handled device having any size. In scenario B, the computing device 100 is a book-reader device having multiple device parts. In scenario C, the computing device 100 includes a pad-type input device, e.g., whereby a user makes touch and/or pen gestures on the surface of the pad-type input device rather than (or in addition to) the display surface of the display mechanism 102. The pad-type input device can be integrated with the display mechanism 102 or separate therefrom (or some combination thereof). In scenario D, the computing device 100 is a laptop computer having any size. In scenario E, the computing device 100 is a personal computer of any type. In scenario F, the computing device 100 is associated with a wall-type display mechanism. In scenario G, the computing device 100 is associated with a tabletop display mechanism, and so on.

In one scenario, the computing device 100 can act in a local mode, without interacting with any other functionality. Alternatively, or in addition, the computing device 100 can interact with any type of remote computing functionality 302 via any type of network 304 (or networks). For instance, the remote computing functionality 302 can provide applications that can be executed by the computing device 100. In one case, the computing device 100 can download the applications; in another case, the computing device 100 can utilize the applications via a web interface or the like. The remote computing functionality 302 can also implement any aspect or aspects of the IBSM 114. Accordingly, in any implementation, one or more functions said to be components of the computing device 100 can be implemented by the remote computing functionality 302. The remote computing functionality 302 can be physically implemented using one or more server computers, data stores, routing equipment, and so on. The network 304 can be implemented by any type of local area network, wide area network (e.g., the Internet), or combination thereof. The network 304 can be physically implemented by any combination of wireless links, hardwired links, name servers, gateways, etc., governed by any protocol or combination of protocols.

A.2. Foreground-Related Movement

This section describes the operation of the IBSM 114 for the case in which the user deliberately moves or strikes the computing device 100 as part of an intentional gesture. Generally stated, a gesture can be defined which incorporates any type of movement, where, as said, the term movement is given a broad interpretation herein. In some cases, a gesture involves moving the computing device 100 to a prescribed orientation with respect to an initial orientation. Alternatively, or in addition, a gesture may involve applying a prescribed motion (e.g., motion along a path, vibratory motion, etc.) to the computing device 100. Motion can be characterized by any combination of parameters, such as speed, acceleration, direction, frequency, etc.

In some cases, the gesture involves the joint application of a contact (via a touch and/or a pen device, etc.) with movement. For example, a user may touch an object on the display surface and then move the computing device 100 to a prescribed orientation and/or move the computing device 100 in a prescribed dynamic manner, e.g., by tracing out a prescribed gesture path. The IBSM 114 can interpret the resultant input events as a request to perform some action with respect to the designated object or other content on the display surface (for example, the object that the user is touching with a finger or pen device). In this case, the contact input events at least partially overlap the movement input events in time. In other cases, the user may apply a contact to the computing device 100 and then apply some telltale movement to the computing device 100, or first apply some telltale movement to the computing device 100 and then apply a contact to the computing device 100. The gestures can include one or more additional sequential phases of contact(s) and/or movement, and/or one or more additional phases of simultaneous contact(s) and movement. In these cases, the contact input events may be interleaved with the movement input events in any manner. In other words, the contact input events need not temporally overlap the movement input events. In other cases, the gesture may solely involve the application of a prescribed movement to the computing device 100. In other cases, the user may apply two or more gestures at the same time. In other cases, the user may apply a gesture which seamlessly transitions into another gesture, and so on. The following explanation illustrates these general points with respect to particular examples. These examples are representative, not exhaustive of the many gestures that can be created based on intentional movement of the computing device 100.

In many of the examples which follow, the user is depicted as making contact with the display surface of the display mechanism 102. Alternatively, or in addition, the user can interact with a pad-type input device, e.g., as illustrated in scenario C of FIG. 3. Further, in many cases, the user is shown as using a two-handed approach to make selections, e.g., where the user holds the device in one hand and makes a selection with a finger (or fingers) of the other hand. But in any of these cases, the user can alternatively make a selection with a thumb (or other hand portion) of the hand which is holding the device. Finally, a general reference to the user's hand is to be understanding as encompassing any part of the hand.

In any of the examples which follow, the computing device 100 can present any type of feedback to the user which indicates that a gesture has been recognized and a corresponding behavior is about to be applied or is in the process of being applied. For example, the computing device 100 can present any combination of a visual feedback indicator, an audible feedback indicator, a haptic (e.g., vibratory) feedback indicator, and so on. The use of non-visual feedback indicators may be useful in some cases because it may be difficult for the user to notice a visual indicator while moving the computing device. According to another general feature, the computing device 100 can present an undo command to allow a user to remove the effects of any unintended gesture.

Figure 4:
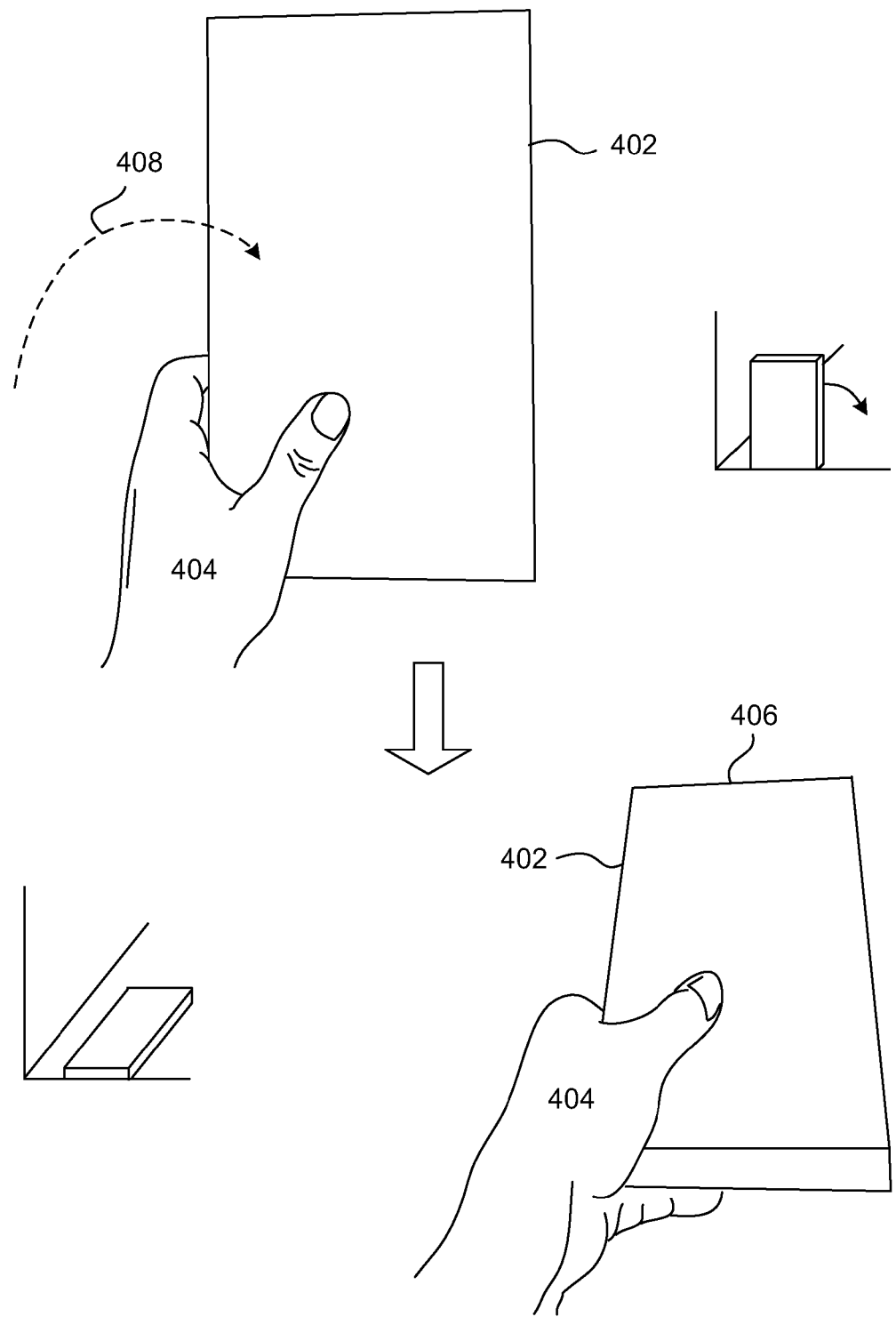
FIGS. 4 and 5 show examples of rotational movements that can be used in intentional gestures.

FIG. 4 shows a scenario in which the user grasps a computing device 402 in a hand 404 (or two hands, not shown). The user then rotates the computing device 402 so that its distal end 406 moves downward, in the direction of the arrow 408. In a complementary movement, the user can rotate the computing device 402 so that its distal end 406 moves upward in the direction opposite to arrow 408.

Figure 5:
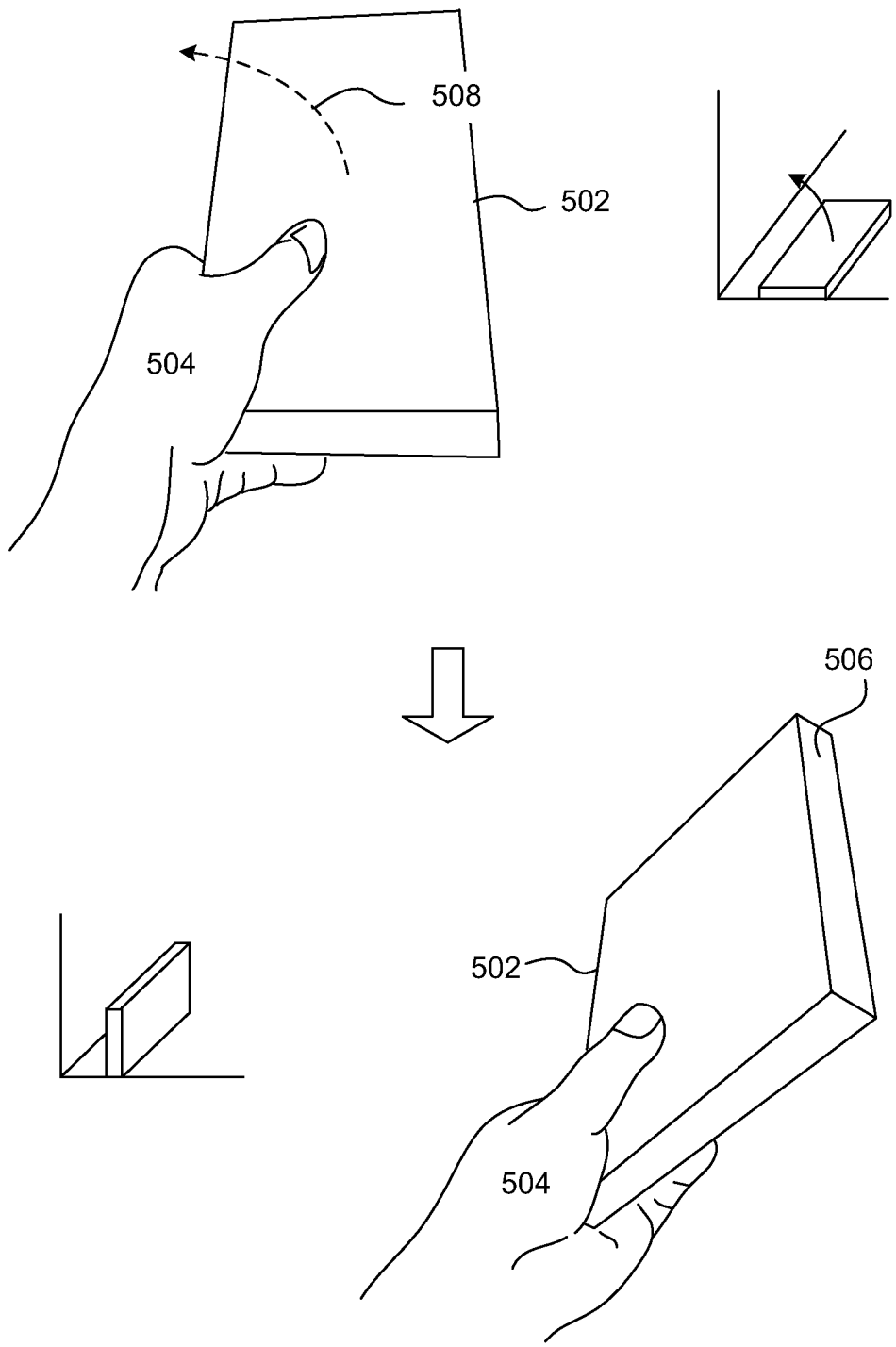

FIG. 5 shows a scenario in which the user grasps a computing device 502 in a hand 504. The user then rotates the computing device 502 so that its side edge 506 moves upward, in the direction of the arrow 508. In a complementary movement, the user can rotate the computing device 502 so that its side edge 506 moves downward in the direction opposite to arrow 508.

Although not illustrated, in another rotation, the user can rotate a computing device in a plane which is parallel to the floor. More generally, these three axes are merely representative; the user can rotate a computing device about any axis in any plane. Further, the user can combine different types of rotational and/or translational movement into a compound gesture.

Figure 6:
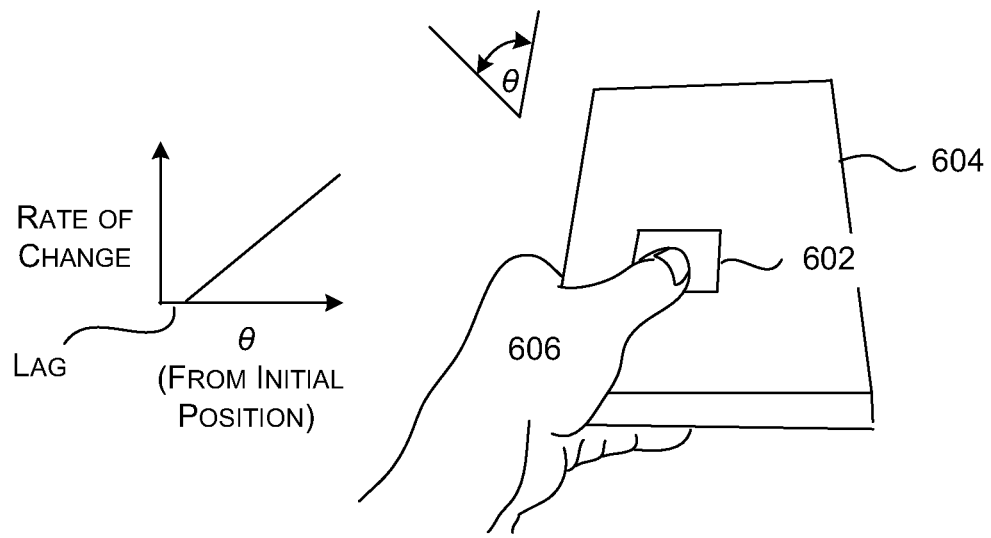
FIGS. 6-9 show different gestures that can incorporate the type of rotational movement shown in either FIG. 4 or FIG. 5.

FIG. 6 shows one gesture that incorporates the type of rotational movement shown in FIG. 4. In this case, assume that the user's intent is to perform some function with respect to object 602 which is displayed on a display surface of a computing device 604. For example, the user may wish to zoom in and enlarge the object 602. As part of the gesture, the user applies a contact to the object 602, such as by touching the object 602 with his or her thumb (in one merely representative case). Note that, in this case, the center of expansion for the zooming action may correspond to the (x, y) point that is associated with the position of the thumb on the display surface. Alternatively, the center of expansion may correspond to a fixed offset from the (x, y) point associated with the thumb position; in this case, the zooming action will be produced at a point directly above the thumb (in one example), rather than underneath it. In another example, the user may wish to enter a value via the object 602. To do this, the user can touch the object to increase the value (and touch some other object, not shown, to decrease the value).

In these scenarios, the angle at which the user holds the computing device 604 controls the rate at which the action is performed, e.g., the rate at which zooming occurs (in the first example cited above) or the rate at which a number in a numeric field is increased or decreased (in the second example cited above), etc. The angle may be measured with respect to an initial orientation of the computing device 604 at the time the user touches the object 602. Alternatively, the angle may be measured with respect to an initial orientation of the device when a user begins a telltale rotational movement, which generally coincides with a touch action (or other contact action), where such telltale movement may shortly follow contact in some cases and shortly precede contact in other cases.

Generally stated, to perform a rotation-based gesture, the user can hold the computing device 604 in a hand 606 (or two hands), touch the object 602, and tilt the computing device 604. That is, if the user wishes to increase the rate of behavior by a large amount, then the user will tilt the computing device 604 by a large amount with respect to the original orientation. If the user wishes to increase the rate of behavior by a smaller amount, then the user can tilt the computing device 604 by a smaller amount. The user can decrease the rate at any time by decreasing the tilt angle. In other cases, the IBSM 114 can also map different behaviors to different directions of rotation with respect to an initial tilt angle. For example, the user can zoom in on the object 602 by tilting the computing device 604 downward, and zoom out on the object 602 by tilting the computing device 604 upward. To prevent small inadvertent rate changes, the IBSM 114 can incorporate a range of initial tilt angles in which no change in rate occurs. If the user progresses beyond a threshold at the end of this dead band, the IBSM 114 begins to change the rate. Such a threshold can be defined in both directions of rotation with respect to the initial tilt angle.

The IBSM 114 can apply any type of function to map a tilt angle into a zoom amount (or whatever behavior is mapped to tilt angle). In one case, the IBSM 114 can apply a linear rate function. In another case, the IBSM 114 can apply a non-linear rate function of any type. For example, as to the latter case, the IBSM 114 can apply inertia-based functions, control system functions of any type, etc.

In the example of FIG. 6, the user can also apply a panning command to the content presented by the computing device 604. For example, as described above, the user can touch one finger to the object 602 in conjunction with rotating the computing device 604 to a prescribed orientation. This may enlarge a portion of the content associated with the object 604. Simultaneously, or in interleaved fashion, the user can use his or her other hand (or the same hand) to pan the content in a lateral direction, e.g., by touching a finger to the content and moving the finger in a desired direction. The embodiment of FIG. 6 accommodates this type of complex control because it leaves one hand of the user free to make panning-type gestures (or any other type of meaningful gesture or input command). If performed in an interleaved fashion, this example is also a demonstration of how one gesture (zooming by rotating the device) can be seamlessly integrated with another gesture (such as panning by moving a finger across the display surface).

In yet other cases, the user can perform the rotational movement described above without designating any particular object on the display surface. In response, the IBSM 114 can apply the zooming (or any other prescribed behavior) to all of the content presented on the display surface, or to any other global content that is appropriate in the context of an environment-specific scenario.

Figure 7:
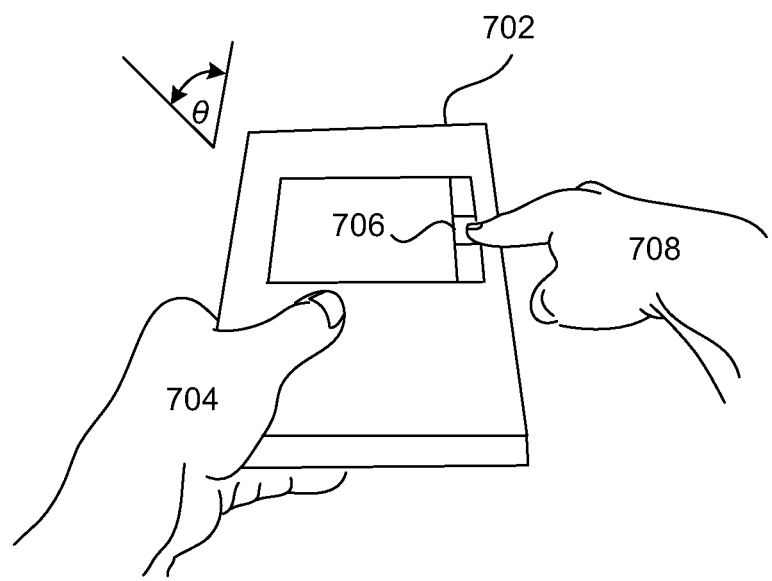

FIG. 7 shows a similar concept to the scenario of FIG. 6. Here, a user holds a computing device 702 in one hand 704 (where, in this particular case, the user is not touching any part of the display surface with the hand 704). The user then manipulates a scroll mechanism 706 with his or her other hand 708. To clarify the depiction, FIG. 7 indicates that the scroll mechanism 706 is associated with an explicit scroll handle. But in other cases, the scroll mechanism can be invoked by touching and moving any content presented on the display surface. This behavior executes a conventional scrolling operation. In addition, the user can tilt the computing device 702 from an initial position to increase and decrease the rate at which scrolling is performed. The scenario shown in FIG. 7 provides good user experience because it provides a convenient means for quickly advancing through long content items, yet also provides a means for more slowly advancing through a content item when so desired.

In the examples of FIGS. 6 and 7, the computing devices (604, 702) provide behavior which is governed by the orientation of the devices (604, 702) with respect to an initial starting position. In addition, or alternatively, a computing device can provide behavior which is responsive to the rate at which a user rotates the device or performs some other telltale movement. For example, in the example of FIG. 6, the user can touch the object 602 with one finger and tip the computing device 604 in the downward direction as shown. The IBSM 114 interprets the rate at which the user performs this tipping movement as indicative of the rate at which some prescribed behavior is to be performed. For example, if the user rapidly tips the computing device 604 in the downward direction (in the manner of casting a line with a fishing rod), the IBSM 114 can rapidly increase (or decrease) a zoom level. Or assume that the object 602 is associated with a scroll command. The IBSM 114 can interpret the user's "line-casting" action as indicative of a request to rapidly scroll through a large document. For example, the user can repeatedly snap the device downward in the illustrated manner to make successive large jumps through a long document (or alternatively, to make discrete jumps to the beginning or end of a document). In this mode of illustrative behavior, the IBSM 114 can be configured to ignore the motion of the computing device when the user returns the computing device back to an initial position after completing a downward snap.

Figure 8:
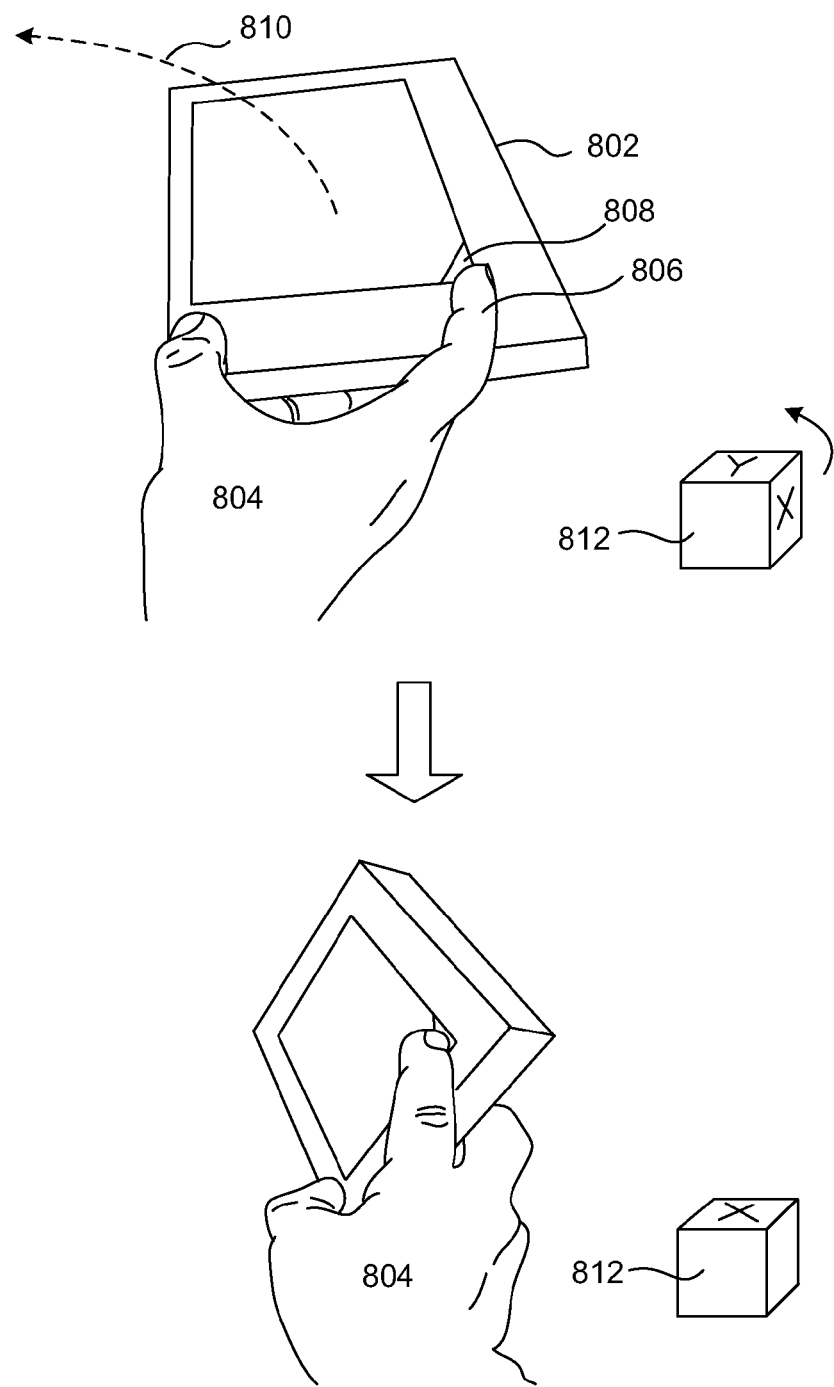

FIG. 8 shows a scenario that incorporates the rotational movement shown in FIG. 5. Here, assume that the user's intent is to apply a finger to mark an original page, advance to another page in a document, and then move back to the original page. To do so, the user may hold a computing device 802 in a hand 804. The user may place a finger 806 on a tab 808 to designate a particular page or other location within a multi-part content item. Assume that the user then flips through subsequent pages or other parts of the multi-part content item. To move back to the original page, the user can flip the computing device 802 up in the direction the arrow 810, in the manner that one might flip over pages of a book. This restores the original page on the display surface of the computing device 802.

The above scenario can be varied in any number of ways. For example, the tab 808 can be located in a different location on the display surface or entirely eliminated in favor of some other visual aid. Alternatively, the computing device 802 can eliminate all such permanent visual aids. Alternatively, or in addition, the computing device 802 can use a visual, audio, and/or haptic feedback indicator, etc. that is dynamically invoked when the user places a finger on the display surface in a manner that is interpreted as a bookmark. The computing device 802 can also provide any type of appropriate visual experience which conveys the page-flipping action to the user, e.g., by displaying a visual simulation of pages being flipped. Further, as set forth below, the interaction illustrated by FIG. 8 can be realized on a dual-screen device; here, the user may hold one device part while rotating the opposite device part to invoke the "flip back" behavior.

The flipping gesture shown in FIG. 8 can be used to achieve other flipping behavior on the display surface, e.g., as defined by a particular environment or application. In one merely illustrative case, assume that the display surface of the computing device 802 displays an object 812 of any type that has plural sides, dimensions, facets, etc. The user can advance to another side by executing the flipping motion shown in FIG. 8. This has the effect of tipping the object 812 on its side to display a new top portion of the object 812. The user can also perform this type of behavior to switch between different applications, options, filters, views, or the like. The user can also perform this type of behavior to remove a first object which is presented on top of a second, underlying, object. That is, a user can rapidly tilt the computing device 802 to move the overlying object to one side of the underlying object, thereby revealing the underlying object(s), and thus making operations on layered objects simple and intuitive. The user can repetitively perform this tilting operation to successively rotate an object by a certain amount (where the amount can be defined in an application-specific manner), or to successively remove layers, etc.

Figure 9:
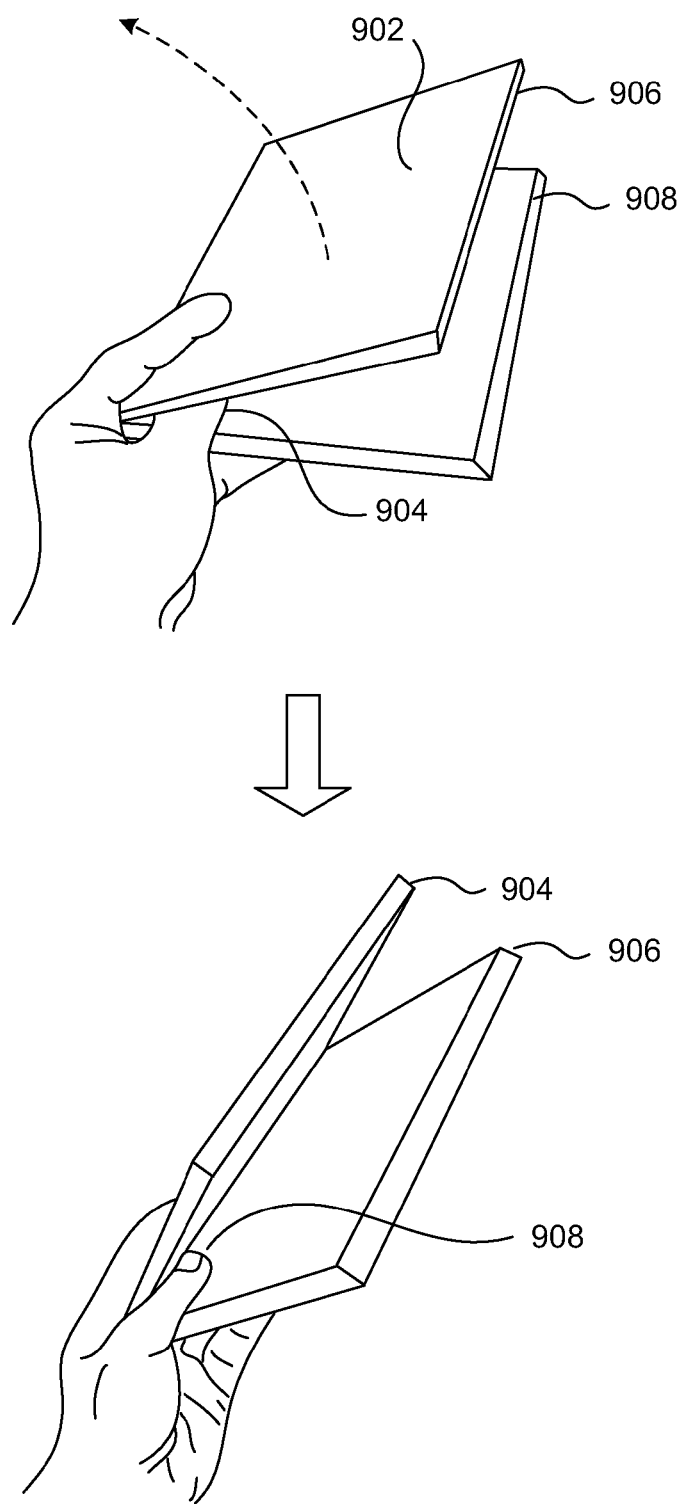

FIG. 9 shows the same basic page-flipping gesture explained above with respect to FIG. 8, but in this case in the context of an ebook reader-type computing device 902. Here, the user may stick his or her thumb 904 (or other finger) on the lower left margin of a display surface of the computing device 902 (or at some other location). This bookmarking operation marks an original page. Then, again assume that the user electronically flips through subsequent pages of a document. In one case, to return to the original page, the user can then flip one device part of the reader-type computing device 902 up in the manner shown in FIG. 8. The IBSM 114 can detect this telltale flipping gesture based on motion-sensing input mechanisms. Alternatively, or in addition, the IBSM 114 can detect this gesture based on the movement of the two display parts (906, 908) with respect to each other, e.g., as detected from an angle sensor (which detects the angle between the device parts).

In another case, to enable the IBSM 114 to more clearly discriminate a page-turning gesture, the user may close the two device parts (906, 908) of the computing device 902, pinching his or her thumb 904 (or other finger) between the two device parts (906, 908) in the manner shown. The user may then execute the flipping motion described above to return to the original page. The computing device 902 can determine that the user has closed the device parts (906, 908) around the thumb 904 by sensing the angle between the device parts (906, 908). Even without the flipping action described above, the act of placing a thumb placed between the two device parts (906, 908) serves a useful purpose of registering a bookmark location.

Figure 10:
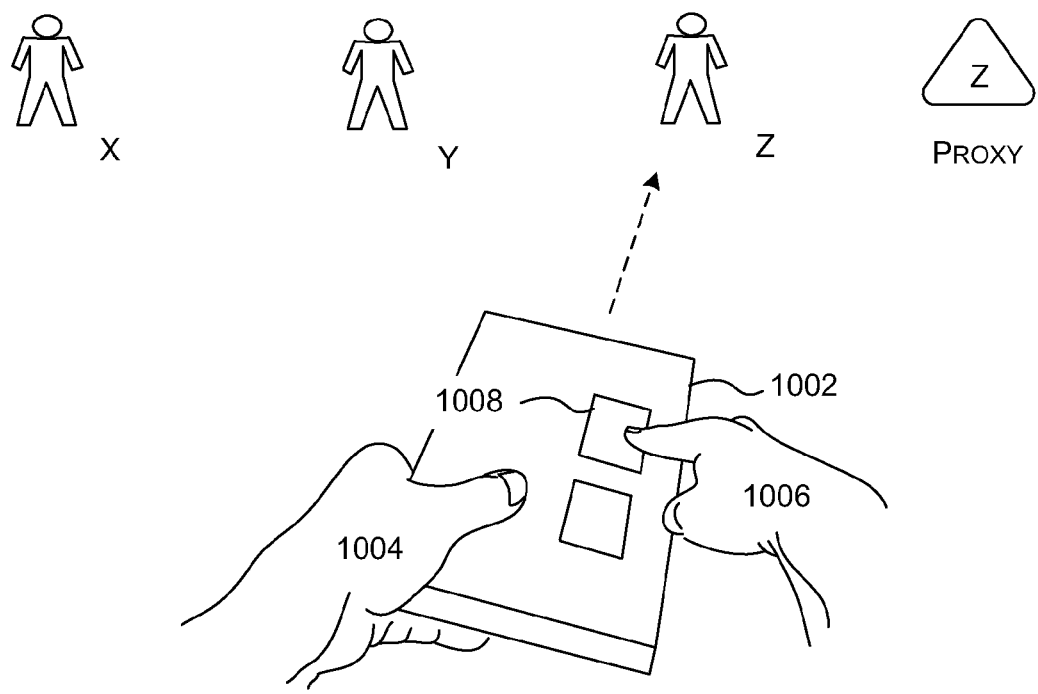
FIG. 10 shows an intentional gesture that involves pointing a computing device towards a target entity.

FIG. 10 shows a scenario in which the user holds a computing device 1002 in a hand 1004 and then points the computing device 1002 in the direction of some target entity, or some assigned proxy of the target entity. The user then may use the other hand 1006 (or the same hand) to identify some object 1008 (e.g., a document, command, etc.) on the display surface of the computing device 1002. The IBSM 114 interprets this gesture as a request to send a copy of the object 1008 to the target entity, or to sync up the content and/or status of the object 1008 with the target entity, or to achieve any other application-specific objective vis-à-vis the object 1008 and the target entity. The IBSM 114 can determine the direction at which the computing device 1002 is pointed based on any type of movement-type input mechanism. The IBSM 114 can determine the relative location of target entities in different ways, such as by manually registering the location of the target entities in advance, automatically sensing the location of the target entities based on signals emitted by the target entities, automatically sensing the location of the target entities based on image capture techniques executed by the computing device 1002 itself, and so forth. Alternatively, or in addition, the IBSM 114 can determine the orientation of the computing device 1002; the complementary IBSM of a target computing device can also determine the orientation of that target device. The IBSM 114 can then determine that the computing device 1002 is pointed towards the target computing device by determining whether the respective users are pointing their devices towards each other. In other cases, one or more users may be pointing at a shared target object, and the IBSM(s) of the respective computing device(s) can detect this fact in any of the ways described above. For example, the shared target object may correspond to a shared peripheral (e.g., a printer, a display device, etc.).

In one example of the scenario shown in FIG. 10, the user can select a file (or other content item) by touching a representation of the file on the display surface. The user can then point the device towards a trash bucket in order to delete the file (where it is assumed that the location of the trash bucket has been previously registered, or is otherwise determinable in one or the ways described above). In a variation, the user can touch the representation of the file on the display surface and tilt the computing device 1002 toward a trash icon on the display surface itself, therefore metaphorically shifting the file into the trash bucket. Many other applications are possible. In one case, the IBSM 114 can present a visual representation of an undo command whenever it deletes a content item in this manner. This enables the user to reverse the effect of unintended deletions.

Figure 11:
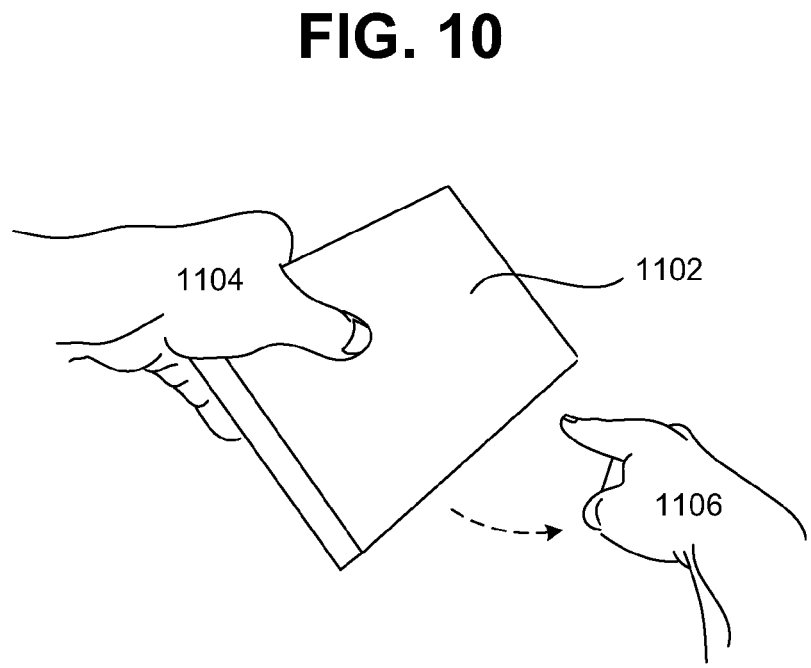
FIG. 11 shows an intentional gesture that involves moving a computing device against a stationary finger.

FIG. 11 shows another scenario in which the user holds a computing device 1102 in a hand 1104 and moves the computing device 1102 so that it contacts a finger of the user's other hand 1106 or other portion of the other hand 1106. This is in contrast to the conventional movement in which a user uses the hand 1106 to press down on the display surface of the computing device 1102. The IBSM 114 can correlate any type of command with this movement. This type of gesture can be coupled with various safeguards to prevent its inadvertent activation. For example, although not shown, the user can apply the thumb of the left hand 1104 to make contact with an icon or the like which enables this particular gestural mode.

In another case (not illustrated), the user can tap down on different objects on the display surface with different degrees of vigor, e.g., with a normal amount of force or with a large amount of force. The IBSM 114 can interpret these two types of touch contacts in a different manner. The IBSM 114 can then perform a first type of behavior for a gentle tap and a second type of behavior for a hard tap. The behaviors that are invoked are application-specific. For example, an application could use a gentle tap to answer an incoming call, and a hard tap to ignore that call. Or an application can use a light tap to mute the ringer and a hard tap to outright ignore the call.

To enable this type of gesture, the movement-type input mechanism(s) 110 can provide, for example, input events that correspond to gently resting a finger on the display surface, tapping the display surface with "normal" force, and vigorously tapping the display surface. The IBSM 114 can then examine the input signals associated with these input events to classify the type of input action that has taken place. For example, the IBSM 114 can interpret input events having large-magnitude signal spikes as indicative of a hard-tapping gesture. In addition, or alternatively, the IBSM 114 can use audio signals (e.g., received from one or more microphones) to discriminate between gentle tapping and hard tapping, and/or signals received from any other input mechanism(s) (such as pressure sensor(s), etc.).

In a related case, the IBSM 114 can discriminate different types of drag movements based on the degree of force with which the user initially applies a finger to the display surface. This allows, for example, the IBSM 114 to discriminate between a light swipe versus vigorously rapping the screen and dragging. The IBSM 114 can again map any behaviors to different types of tap-and-drag gestures.

Figure 12:
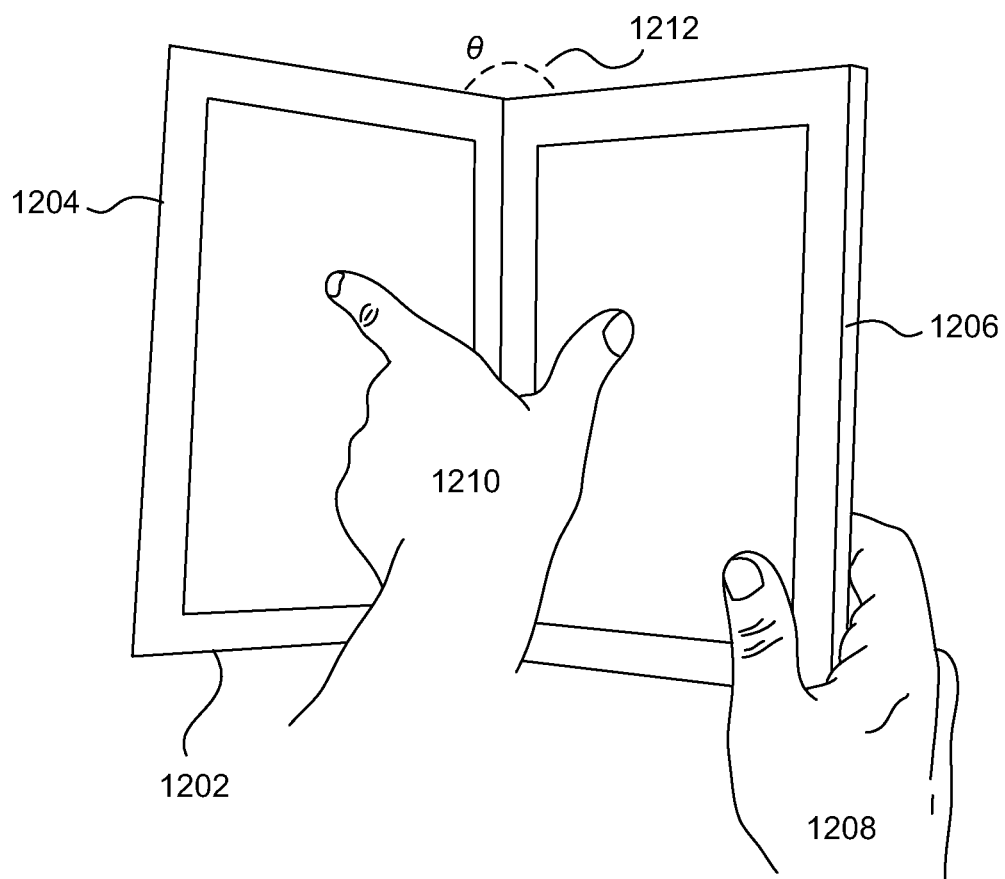
FIG. 12 shows an intentional gesture that involves applying a touch to two display parts of a computing device that has at least two display parts.

FIG. 12 describes another scenario in which the user holds a computing device 1202 that has two device parts (1204, 1206) in a hand 1208. With the other hand 1210, the user touches the display surfaces provided on the two device parts (1204, 1206), with a prescribed angle 1212 between the two device parts (1204, 1206). The IBSM 114 can map this gesture into any type of behavior. Variations of this gesture can be defined by dynamically changing the angle 1212 between the two device parts (1204, 1206) and/or dynamically changing the positions of the finger and thumb placed on the display surfaces of the two device parts (1204, 1206).

Figure 13:
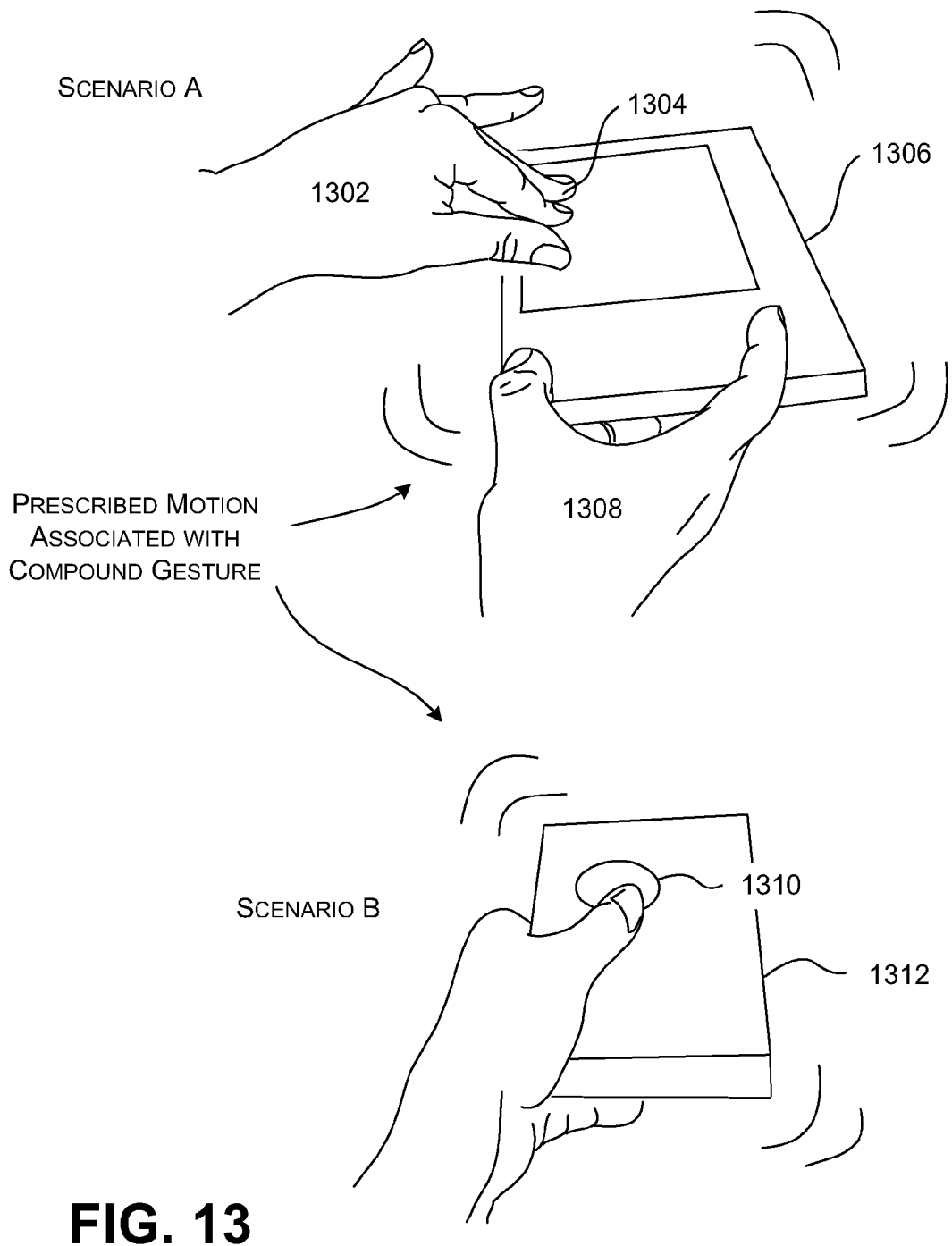
FIG. 13 shows an intentional gesture which is enabled by the application of an idiosyncratic multi-touch gesture.

FIG. 13, in scenario A, describes a more general gesture in which a user uses a hand 1302 to place an idiosyncratic combination of fingers 1304 on the display surface of a computing device 1306. With the other hand 1308, the user may proceed to move the computing device 1306 in any telltale manner, such as by shaking the computing device 1306 in a particular direction. The computing device 1306 is unlikely to confuse this gesture with incidental motion of the computing device 1306 due to the presence of the idiosyncratic multi-touch touch gesture. The user can also apply different multi-touch gestures in conjunction with the same basic motion to convey different commands.

Moreover, to repeat, the user can apply any prescribed type of contact to an individual object or particular region on the display surface and then apply a prescribed movement to the computing device. The combination of focused contact and movement helps discriminate deliberate gesture-based movement from accidental movement. For example, as shown in scenario B of FIG. 13, the user can touch an object 1310 on the display surface of a computing device 1312 and then vigorously shake the computing device 1312. The IBSM 114 can interpret this action in any predetermined manner, such as a request to delete the designated object 1310, undo the last action that was taken on the designated object 1310, move the designated object 1310 to a particular folder, shuffle the object 1310 so that it is displayed in the foreground, and so on.

In another case, the user can touch an object on the display surface, upon which the IBSM 114 provides a menu. While still touching the display surface, the user can then apply a telltale movement to the computing device. The IBSM 114 can interpret this joint action as a request to enlarge the menu, or to select a particular option from the menu. Note that this approach integrates three steps into a single continuous action: (1) selecting an object; (2) activating a motion-sensing gestural mode; and (3) selecting a particular command or gesture to apply to the selected object(s). Other examples of select-and-move gestures were described above, e.g., with respect to the zooming, scrolling, and page-turning examples.

Further, the IBSM 114 can interpret dynamic motion gestures in a different manner based on the orientation of the computing device. For example, in a first scenario, assume that the user holds a computing device in his or her hands and shakes its back and forth. In a second scenario, assume that the user lays the computing device on a table and shakes it back and forth, while the device is lying prone. The IBSM 114 can interpret these two scenarios as conveying two distinct types of gestures. Further, the IBSM 114 can interpret movement-based gestures in the context of whatever application(s) the user is interacting with at the moment. For example, the IBSM 114 can interpret the same movement-type gesture in different ways when it is performed in the context of two respective applications.

Figure 14:
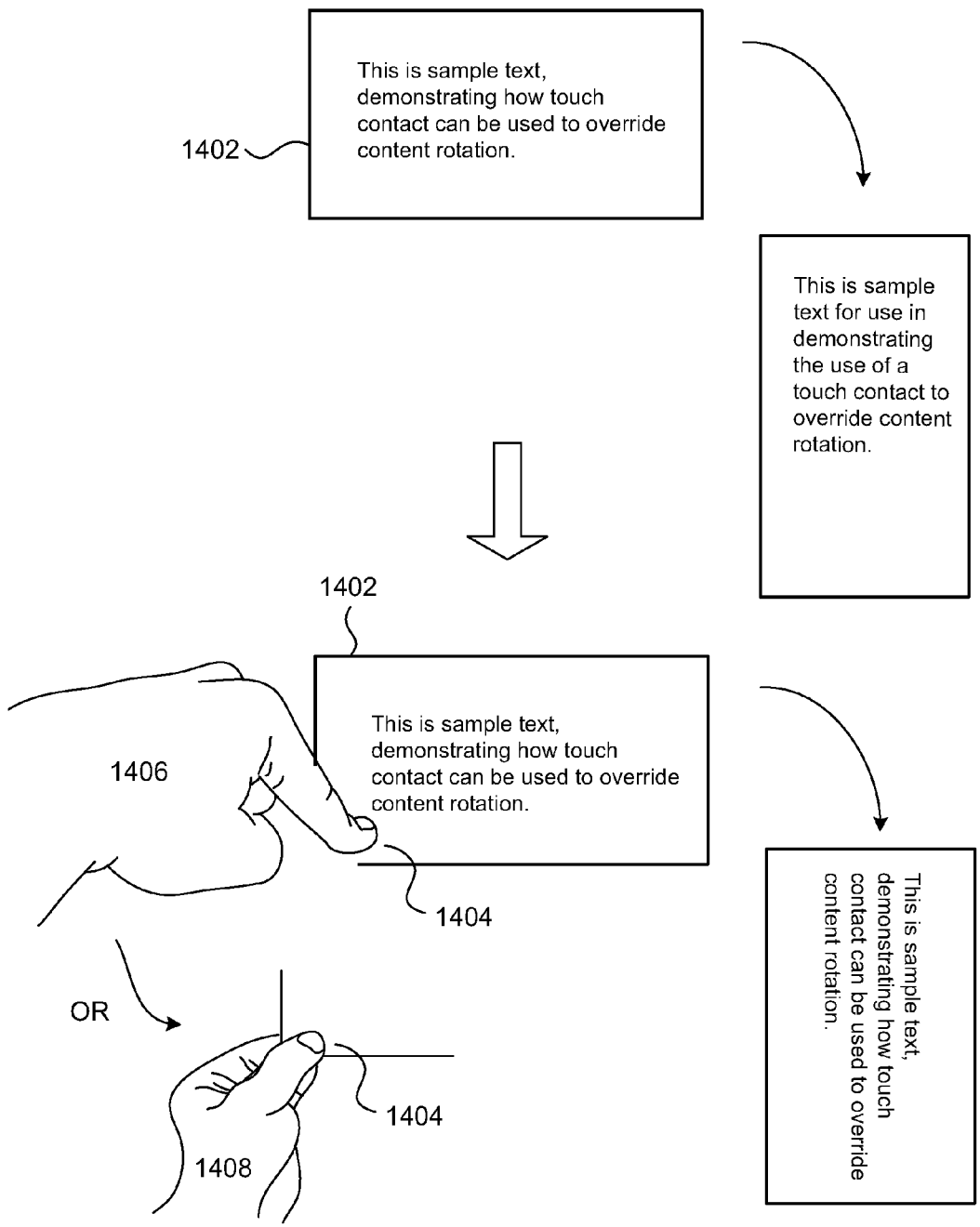
FIG. 14 shows an intentional gesture which involves applying a contact point to a computing device and then rotating the computing device.

Finally, FIG. 14 shows a scenario in which the user wishes to rotate a computing device 1402 from landscape mode to portrait mode (of vice versa) without causing the content presented the computing device 1402 to also rotate. To perform this task, the user can touch any portion of the display surface, such as (but not limited to) a corner 1404. For example, the user can press down on the display surface while the computing device 1402 lies on a flat surface, such a table, as indicated by the gesture made with the hand 1406. Or the user can pinch the computing device while holding the computing device 1402, as indicated by the gesture made with the hand 1408. The user then rotates the computing device 1402 by approximately 90 degrees (or some other application-specific rotational amount). In one implementation, upon recognizing this gesture, the IBSM 114 can prevent the computing device 1402 from automatically rotating the text. This same behavior can be performed in reverse. That is, as a default, the computing device 1402 will not rotate the content when the computing device 1402 is rotated. Placing a contact on the display surface while rotating the computing device 1402 will then cause the content to also rotate. Rotation can be performed about any axis, such an axis defined by the contact point itself.

In another example, the user can establish a contact point and then rotate the computing device, but without moving the computing device relative to the finger(s) which establish the contact point. For example, the user can pinch the computing device to establish a contact point and then lie down on a couch or bed, and, in doing so, rotate the computing device approximately 90 degrees with respect to its initial orientation. In this case too, the IBSM 114 can interpret the device movement together with the application of the contact point as an instruction to disable (or enable) content rotation.

In one case, a computing device can maintain a rotation lock after the computing device is moved to the appropriate orientation, even when the user removes the contact point. When finished operating in this mode, the user can then expressly activate a command which removes the rotation lock. In addition, or alternatively, the user can change the orientation of the device to automatically remove the rotation lock.

A.3. Background-Related Movement

This section describes the operation of the IBSM 114 when the movement applied to the computing device 100 is not a deliberate component of an intentional gesture, and therefore constitutes background movement. The IBSM 114 can interpret the nature of this movement and then act on it to enhance the accurate analysis of an input action. The examples presented in this section are representative, not exhaustive.

Figure 15:
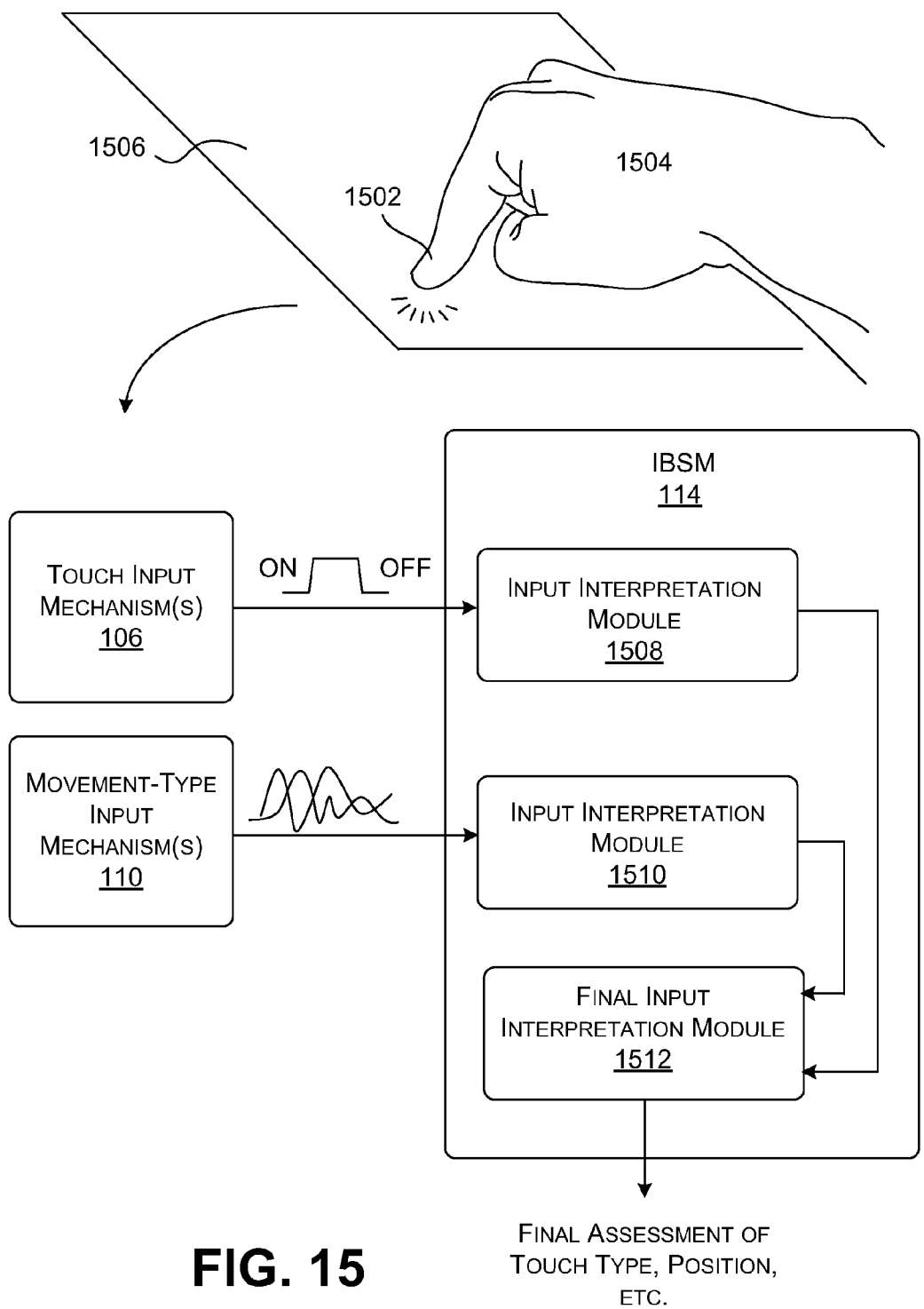
FIG. 15 shows functionality for using movement input events to enhance the interpretation of contact input events, e.g., upon the application or removal of a finger (or other hand part) from the display surface of a computing device.

FIG. 15 shows a first scenario in which a user uses a finger 1502 of a hand 1504 to press down on a display surface of a computing device 1506. Or assume that the user removes the finger 1502 from the display surface. In response to this action, the IBSM 114 receives touch input events from the touch input mechanism(s) 106. These events register the actual (or imminent) contact of the finger 1502 with the display surface, or the removal of that contact. The IBSM 114 also receives movement input events from the movement-type input mechanism(s) 110. These events register motion that is inadvertently caused when the user applies or removes his finger 1502 from the display surface.

A first input interpretation module 1508 can analyze the touch input events, e.g., by determining, from its perspective, the position and timing at which a touch contact is applied or removed. The first input interpretation module 1508 bases its conclusion primarily on the extent (and/or shape) of contact between the user's finger and the display surface. A second input interpretation module 1510 can analyze the movement input events, e.g., by also determining, from its perspective, the position and timing at which a touch contact is applied or removed, together with any jostling that may have occurred in the process. This is possible because the position and timing at which touches are applied and removed can also be inferred from the movement input events. More specifically, the second input interpretation module 1510 bases its conclusion, in part, on the magnitude, the general shape, and frequency characteristics of the movement signals provided by the movement-type input mechanism(s) 110. This can help pinpoint when the contact has been applied or removed. The second input interpretation module 1510 can also base its conclusion on the manner in which the computing device moves upon the application or removal of a touch. This can help distinguish the position at which the contact is being applied or moved. For example, if the user holds the computing device upright and taps down on a corner, the computing device can be expected to rock in a telltale manner which is indicative of the location at which touch has occurred.

A final input interpretation module 1512 can then use the conclusions of the second interpretation module 1510 to modify (e.g., to correct) the conclusions of the first interpretation module 1508. For example, the final input interpretation module 1512 can conclude that a touch was applied at a true location (x, y), but because of inadvertent movement associated with the application of the touch, there was movement to a position (x+Δx, y+Δy). A similar inadvertent movement can occur when the user removes his finger. Alternatively, or in addition, the final input interpretation module 1512 can adjust the timing at which touch is considered to have been applied or removed. As another example, if a contact is registered with little or no associated movement signal, the final input interpretation module 1512 may conclude that the contact likely represents inadvertent contact with the display surface. The IBSM 114 can thus ignore this contact or otherwise treat it differently than "normal" contact actions.

The IBSM 114 can take various actions on the basis of the conclusions reached by the final input interpretation module 1512. In one case, the IBSM 114 can correct touch input events to account for accidental movement that has been detected, e.g., by refining an indication of a location and/or timing at which the user has applied or removed a touch contact. In addition, the IBSM 114 can restore the display surface and/or an application to a state prior to the time at which any inadvertent movement may have taken place.

In the case of FIG. 15, plural component interpretation modules feed conclusions into the final interpretation module 1512. But in another implementation, the final interpretation module 1512 can perform analysis on raw input events provided by the input mechanisms, that is, without the component interpretation modules.

The basic functionality of FIG. 15 can also be used to enhance the recognition of gestures. For example, a flicking-type movement may resemble a quick scrolling action (from the perspective of the nature of contact that is made with the display surface), yet the user may perform these two actions to convey different input commands. To help discriminate between these two input actions, the IBSM 114 can interpret the resultant contact input events in conjunction with the movement input events. The movement input events can help distinguish between the two input actions insofar as a flicking motion has a different motion profile than a scrolling operation.

The IBSM 114 may also use the motion signals to detect different ways of articulating a particular action, such as scrolling with the thumb of the hand that is holding the computing device, versus scrolling using the index finger of the opposite hand. Such situations, when detected, may be used to optimize the user's interaction with the computing device, e.g., by enabling the IBSM 114 to more accurately discriminate the user's input actions. For example, the computing device can adjust its interpretation of input events based on its understanding of what finger is being used to contact the computing device, e.g., by allowing greater forgiveness for off-axis motions when it is determined that the user is scrolling with a thumb.

In another example, IBSM 114 can determine the fingers that the user is using when typing on a soft (touch screen) keyboard. In one case, the user may type with two thumbs. In another case, the user may type with a single finger while holding the device with the opposite hand. These two modes have different respective movement profiles that describe the key strikes. The IBSM 114 can use the different movement profiles to help infer which method the user has employed to strike a given key. The IBSM 114 can then apply an appropriate Gaussian distribution when interpreting each type of touch contact. This may improve the efficiency of touch screen typing while reducing the likelihood of errors.

The functionality of FIG. 15 can also be used to detect input actions that are entirely accidental. For example, in some cases, legitimate input events may have one or more prescribed movement profiles, while inadvertent input events may have one or more other prescribed movement profiles. For example, a "clean" tap on the display surface with an index finger may have a profile which is indicative of a legitimate input activity, while an accidental contact with the display surface may have a profile which is indicative of an inadvertent input activity, e.g., which may be caused by a thumb or pinky finger brushing up against the display surface.

Figure 16:
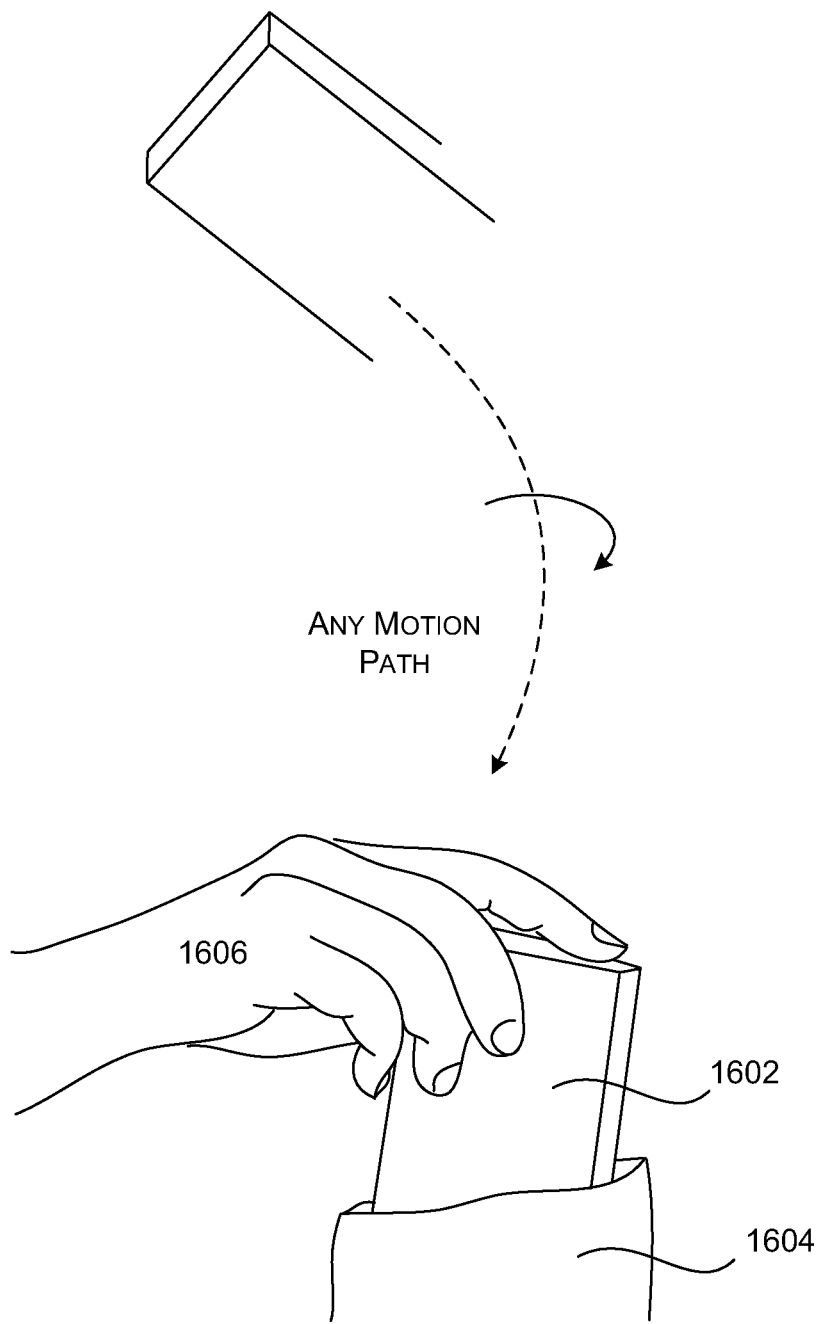
FIG. 16 shows background movement that typically causes large movement input events.

FIG. 16 shows another scenario in which the user picks up a computing device 1602 with a hand or sets the computing device 1602 down after use. In the particular example of FIG. 16, the user is in the process of placing the computing device 1602 into a pocket 1604 with a hand 1606. In this circumstance, the IBSM 114 may receive movement input events from the movement-type input mechanism(s) 110 that exceed a prescribed threshold in a temporal window. The input events may also reveal that the device has been moved to an unusual viewing posture. The large movement input events are produced because the user has likely rapidly moved and tumbled the computing device 1602 through space to place the computing device 1602 into the pocket 1604. Also assume that the user inadvertently touches the display surface of the computing device 1602 in the process of placing the computing device 1602 into the pocket 1604. If so, the IBSM 114 can conclude (based on the large movement input events, and optionally other factors) that the touch input events are likely inadvertent. The computing device 1602 may also include a light sensor and/or proximity sensor which can independently confirm the fact that the computing device 1602 has been placed in the pocket 1604, e.g., when the light sensor suddenly indicates that the computing device 1602 has been moved to a darkened environment. The IBSM 114 can then respond to the touch input events by ignoring them. Further, as stated above, the IBSM 114 can restore the display surface to a state prior to the inadvertent input action. In addition, or alternatively, the IBSM 114 can restore a prior application state.

For example, assume that the user touches the display surface of the computing device in the course of placing the device in his pocket. The IBSM 114 may be able to conclude on the basis of the movement alone that the touch was inadvertent. The device can then "undo" any command triggered by the inadvertent touch. If the movement is not sufficiently informative, the IBSM 114 can conclude on the basis of the output of the light sensor and/or other sensors that the touch was inadvertent. The computing device 1602 can then again remove the effect of the inadvertent contact.

In another scenario (not shown), the user may be operating the computing device 1602 in a noisy environment (e.g., a non-steady environment), such as on a bumpy bus ride or the like. In this case, the IBSM 114 can analyze the movement input events to determine regular perturbations of the computing device 1602, indicative of a noisy environment. To address this situation, the IBSM 114 can perform the actions described above, such as by ignoring parts of touch input events that are assessed as accidental, as well as restoring a display state and/or application state(s) to remove erroneous changes. In addition, or alternatively, the IBSM 114 can attempt to modify the touch input events to subtract out the background noise associated with the movement input events. In addition, or alternatively, the IBSM 114 can decrease the sensitivity at which it indicates that a valid touch event has occurred. This will force the user to be more deliberate in accurately entering intentional touch input events. But this will also have the desirable effect of more effectively ignoring inadvertent input events caused by the noisy environment.

Figure 17:
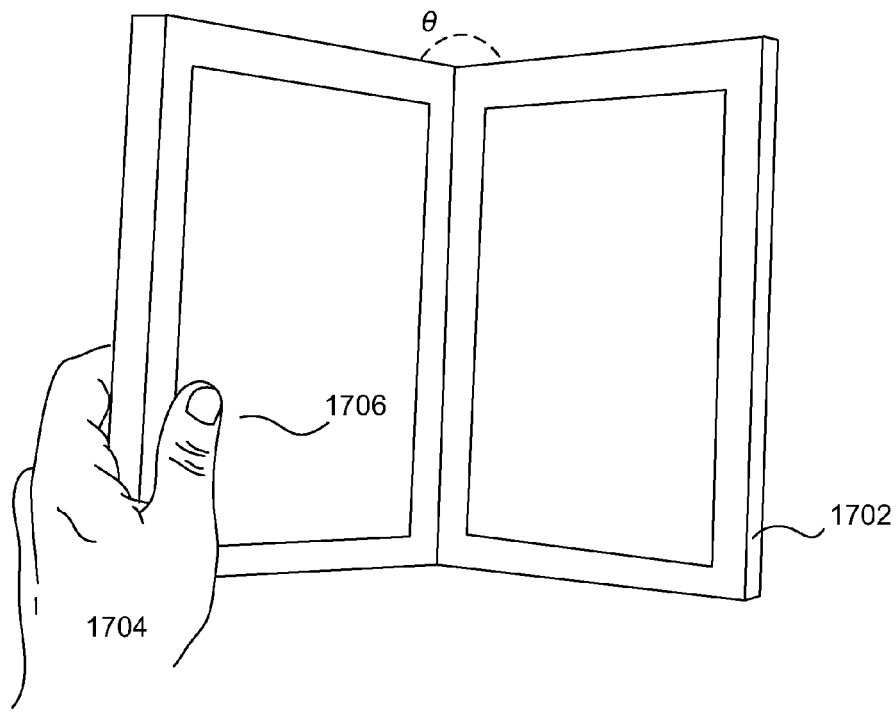
FIGS. 17 and 18 illustrate circumstances in which a computing device may disregard touch input events based on the orientation of the computing device.
Figure 18:
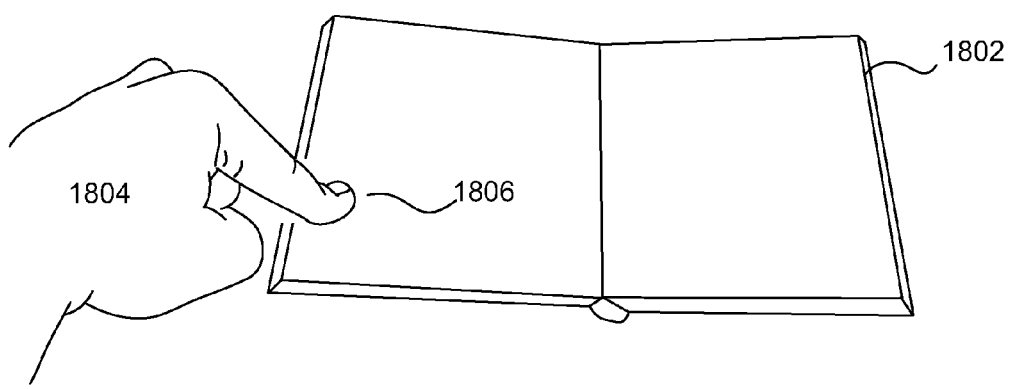

FIG. 17 shows a scenario in which the user holds a computing device 1702 in a hand 1704 during use. In this case, the user's thumb 1706 may inadvertently contact the display surface of the computing device 1702. In contrast, FIG. 18 shows a scenario in which the user rests a computing device 1802 flat on a table or the like. The user then uses a hand 1804 to press down an index finger 1806 in the lower left corner of the display surface of the computing device 1802. The IBSM 114 can examine the respective orientations of the computing devices (1702, 1802) and conclude that the thumb placement that occurs in FIG. 17 is more likely to be inadvertent compared to the finger placement shown in FIG. 18, even though these contacts occur in the same region of the display surface and may have similar shapes. This is because it is natural for the user to hold the computing device 1702 in the manner shown in FIG. 17 when holding it aloft. But it is less likely to accidently place a single finger on the display surface when the computing device 1802 is lying prone in the manner shown in FIG. 18. The above-described motion analysis can help confirm conclusions based on orientation. In addition, one or more other sensors (such as a light sensor, a proximity sensor, etc.), if placed at appropriate location(s) on the computing device 1802, can help determine whether a computing device is lying flat on a table in the manner shown in FIG. 18. The IBSM 114 can address the accidental touch shown in FIG. 17 in any of the ways described above, such as by ignoring the touch input events.

In the case of FIG. 17 (and, in fact, in all scenarios), the IBSM 114 can also take other contextual factors into account when interpreting contact input events and movement input events. One such contextual factor is the application with which the user is interacting when the input events occur. For example, assume that a first user is reading content using a book reader type device and then places a thumb on a certain part of the page. Assume that a second user is scrolling through a web page and places a thumb in the same general part of the page. The IBSM 114 may be more likely to interpret the thumb placement as intentional for the first scenario compared to the second scenario. This is because the user may have placed his or her thumb on the page in the first scenario to bookmark that page. Furthermore, the cost of mistakenly bookmarking a page is negligible, whereas the cost of accidentally scrolling or flipping to another page is high in terms of the disruption to the user's current task.

In another dual-screen scenario, the IBSM 114 can use the movement input mechanisms to sense the orientation at which the user is holding the computing device. The determined orientation may fit a profile which indicates that the user is looking at one display part, but not another. That is, the user may have oriented the computing device to optimize interaction with just one of the display parts. In response, the IBSM 114 can place the presumed unused display part in a low-power state. Alternatively, or in addition, the IBSM 114 can rely on other input mechanisms to determine which display part the user is viewing, such as the image sensing input mechanisms 112. Alternatively, or in addition, in some situations, the IBSM 114 can be configured to ignore input events that are received via an unused display part, classifying them as unintended contacts.

Generally, the IBSM 114 can implement the above-described scenarios in different ways. In one case, the IBSM 114 can maintain a data store that provides various profiles that describe the telltale input characteristics of various known actions, including both intentional and unintentional actions. The IBSM 114 can then compare the input events associated with an unknown input action against the data store of pre-stored profiles to help diagnose the unknown input action. The data store can also include information which indicates behavior that may be executed to address the input action, once diagnosed.

Alternatively, or in addition, the IBSM 114 can apply any type of algorithmic technique to combine the contact input events with the movement input events. For example, the IBSM 114 can apply a formula which indicates the probable location of a touch contact on a display surface based on movement input events; the IBSM 114 can then apply another formula which indicates how this position (assessed based on movement alone) can be used to correct a position that is assessed based on contact input events. The nature of such algorithms is device-specific and can be developed based on theoretical analysis and/or experimental analysis.

B. Illustrative Processes

Figure 19:
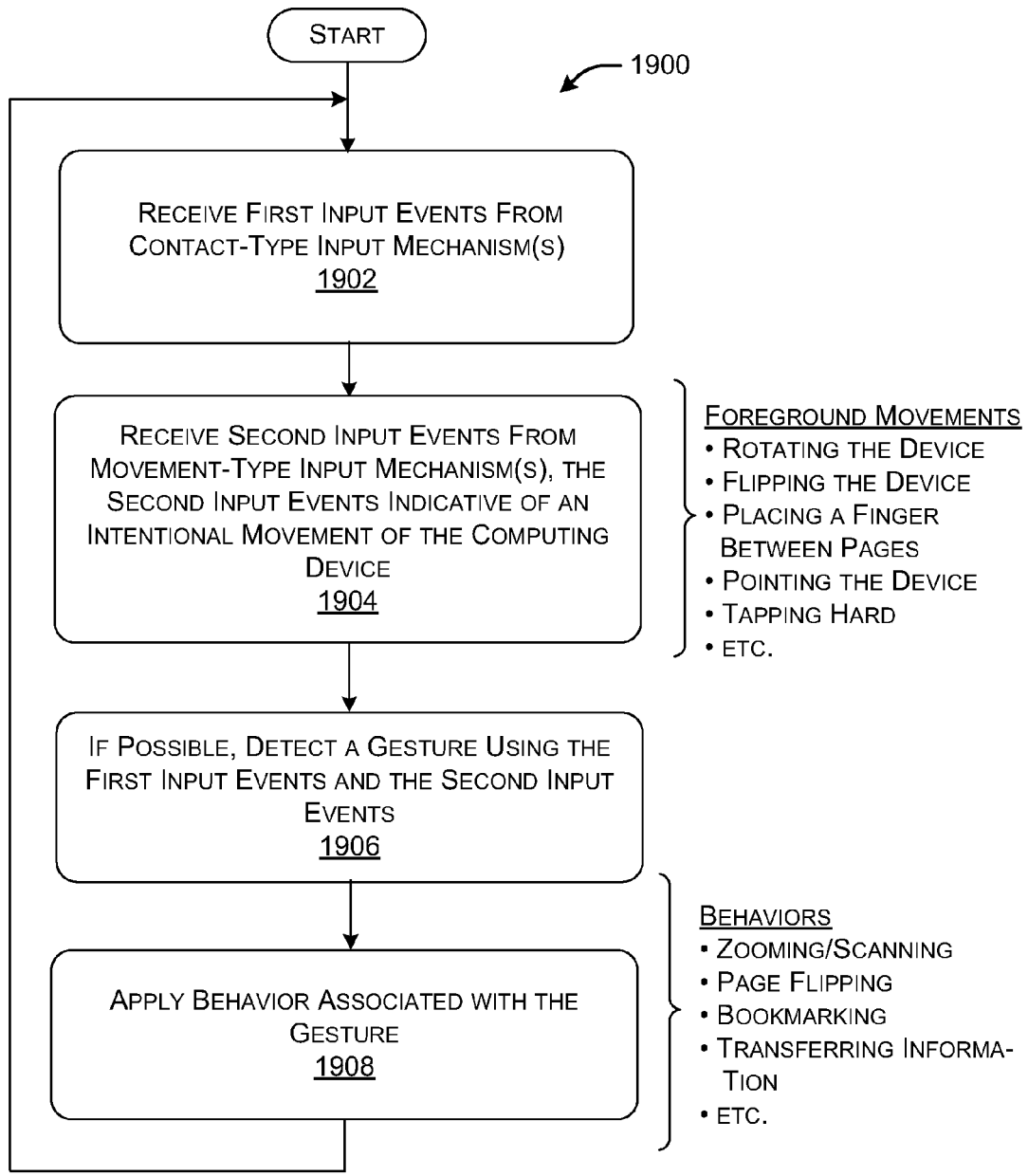
FIG. 19 shows a flowchart which explains one manner of operation of the computing device of FIG. 1 in a foreground mode of operation.
Figure 20:
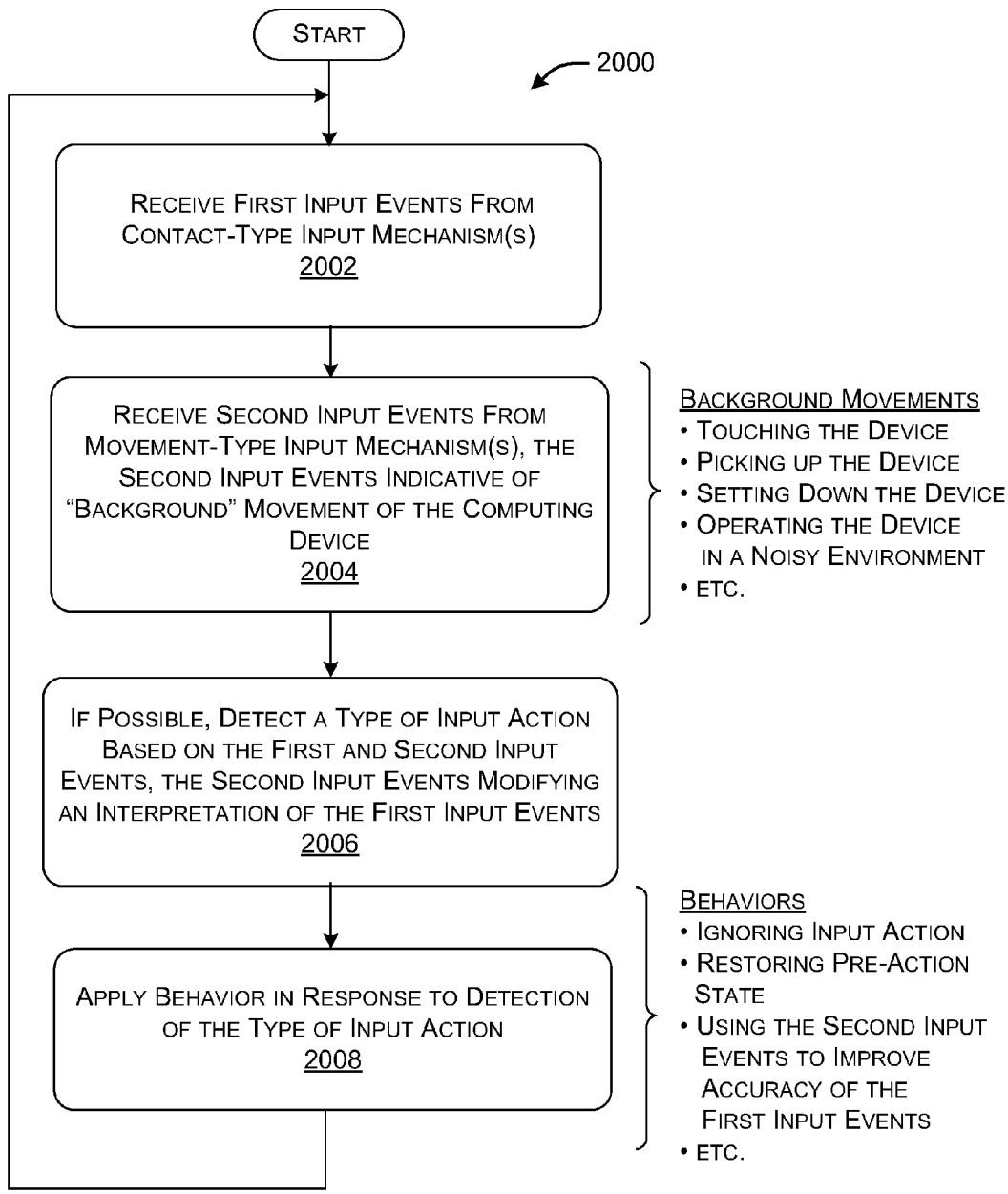
FIG. 20 shows a flowchart which explains one manner of operation of the computing device of FIG. 1 in a background mode of operation.

FIGS. 19 and 20 show procedures (1900, 2000) that explain the operation of the computing device 100 of FIG. 1 in the foreground and background modes of operation described in Section A, respectively. Since the principles underlying the operation of the computing device have already been described in Section A, certain operations will be addressed in summary fashion in this section.

FIG. 19 shows a procedure 1900 for controlling the computing device 100 in response to an intentional movement of the computing device 100. In block 1902, the IBSM 114 receives first input events from one or more contact-type input mechanisms. In block 1904, the IBSM 114 receives second input events from one or more movement-type input mechanisms. The second input events are indicative of movement of the computing device in an intentional manner. The right margin of FIG. 19 enumerates some possible intentional movements that may take place. More generally, blocks 1902 and 1904 can be performed in any order, and/or these operations can overlap. In block 1906, the IBSM 114 interprets, if possible, the intentional gesture that the user has made based on the first input events and the second input events. In block 1908, the IBSM 114 applies a behavior that is correlated with the intentional gesture that has been detected. In this sense, the interpretation performed in block 1906 enables the behavior to be executed in block 1908, where the operations of blocks 1906 and 1908 can be performed by the same component or by different respective components. The right margin of FIG. 19 enumerates a few behaviors that may be invoked.

The feedback loop shown in FIG. 19 indicates the IBSM 114 repeatedly analyzes the input events over the temporal progression of an input action. In the course of the input action, the IBSM 114 can increase the confidence at which it detects the nature of the input action. At first, the IBSM 114 may be unable to diagnose the nature of the input action. As the action proceeds, the IBSM 114 may then be able to predict the action with a relatively low degree of confidence, and it may, in fact, incorrectly interpret the input action. As the input action proceeds further, the IBSM 114 increases its confidence and, if possible, eventually correctly determines the type of input action that has taken place. Or the IBSM 114 can abandon an interpretation that is no longer supported by the input events that are being received. The IBSM 114 can "back out" of any incorrect assumptions by restoring the display surface and/or any application to a pre-action state in the manner described above.

FIG. 20 describes a procedure 2000 for controlling the computing device 100 in response to unintentional movement of the computing device 100. In block 2002, the IBSM 114 receives first input events from one or more contact-type input mechanisms. In block 2004, the IBSM 114 receives second input events from one or more movement-type input mechanisms in response to movement of the computing device 100. More generally, blocks 2002 and 2004 can be performed in any order, and/or these operations can overlap. The movement in this case is indicative of background movement of the computing device 100, meaning movement that is not the active focus of the user. The right margin of FIG. 20 enumerates some of the possible background movements that may occur. In block 2006, the IBSM 114 detects a type of input action that has taken place based on the first input events and the second input events, in optional conjunction with other factors. In effect, the second input events modify or qualify the interpretation of the first input events. In block 2008, the IBSM 114 can apply appropriate behavior in response to the detection of the type of input events in block 2006. The operations of blocks 2006 and 2008 can be performed by the same component or by different respective components. The right margin of FIG. 20 enumerates some of the possible behaviors that the IBSM 114 may execute.

In a similar manner to that set forth for FIG. 19, the feedback loop shown in FIG. 20 indicates that the IBSM 114 can repeat its analysis throughout the course of an input action to progressively improve the confidence of its analysis.

C. Representative Processing Functionality

FIG. 21 sets forth illustrative electrical data processing functionality 2100 that can be used to implement any aspect of the functions described above. With reference to FIG. 1, for instance, the type of processing functionality 2100 shown in FIG. 21 can be used to implement any aspect of the computing device 100. In one case, the processing functionality 2100 may correspond to any type of computing device that includes one or more processing devices. In all cases, the electrical data processing functionality 2100 represents one or more physical and tangible processing mechanisms.

The processing functionality 2100 can include volatile and non-volatile memory, such as RAM 2102 and ROM 2104, as well as one or more processing devices 2106. The processing functionality 2100 also optionally includes various media devices 2108, such as a hard disk module, an optical disk module, and so forth. The processing functionality 2100 can perform various operations identified above when the processing device(s) 2106 executes instructions that are maintained by memory (e.g., RAM 2102, ROM 2104, or elsewhere).

More generally, instructions and other information can be stored on any computer readable medium 2110, including, but not limited to, static memory storage devices, magnetic storage devices, optical storage devices, and so on. The term computer readable medium also encompasses plural storage devices. In all cases, the computer readable medium 2110 represents some form of physical and tangible entity.

The processing functionality 2100 also includes an input/output module 2112 for receiving various inputs from a user (via input mechanisms 2114), and for providing various outputs to the user (via output modules). One particular output mechanism may include a display mechanism 2116 and an associated graphical user interface (GUI) 2118. The processing functionality 2100 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), etc., or any combination thereof. The communication conduit(s) 2122 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device, comprising:
   plural input mechanisms for responding to an input action, including:
      at least one contact-type input mechanism for receiving at least one contact input event that indicates contact with the computing device; and at least one movement-type input mechanism for receiving at least one movement input event that indicates one or more of orientation and motion of the computing device;

an interpretation and behavior selection module (IBSM) configured to detect a type of the input action that has occurred using a combination of said at least one contact input event and said at least one movement input event; and wherein the IBSM is further configured to detect and respond to one or more unintentional input actions by automatically adjusting a timing at which the at least one contact input event is considered to have been received relative to a timing at which the at least one movement input event is actually received.

2. The computing device of claim 1, wherein the computing device is a handheld computing device.

3. The computing device of claim 1, wherein said at least one contact-type input mechanism comprises a touch input mechanism for sensing contact of a hand with the computing device.

4. The computing device of claim 1, wherein said at least one movement-type input mechanism comprises one or more of an accelerometer and a gyro device.

5. The computing device of claim 1, wherein the IBSM is configured to repeatedly analyze contact input events and movement input events in a course of the input action to improve a level of confidence at which the IBSM detects the type of input action.

6. The computing device of claim 1, wherein the IBSM is configured to conclude that at least part of the input action is unintentional when said at least one movement input event exceeds a prescribed threshold.

7. The computing device of claim 6, wherein the input action is associated with picking up or setting down the computing device.

8. The computing device of claim 6, wherein the IBSM is configured to also conclude that said at least part of the input action is unintentional based on an output of a light sensor.

9. The computing device of claim 1, wherein the IBSM is configured to conclude that at least part of the input action is unintentional when said at least one movement input event exhibits noise-like motion characteristics indicative of operation of the computing device in a noisy environment.

10. The computing device of claim 1, wherein the IBSM is configured to conclude that at least part of the input action is unintentional due to unintentional movement that occurs during application or removal of a touch contact.

11. The computing device of claim 1, wherein the IBSM is configured to detect a type of gesture associated with the input action based on a combination of said at least one contact input event and said at least one movement input event.

12. The computing device of claim 1, wherein the IBSM is configured to determine whether the input action is associated with an unintentional application of a touch contact based on a determined orientation of the computing device.

13. The computing device of claim 1, wherein the IBSM is further configured to execute a behavior in response to detection of the type of the input action, and wherein, as one behavior, the IBSM is configured to reject at least part of said at least one contact input event when the IBSM determines that at least part of the input action is unintentional.

14. The computing device of claim 1, wherein the IBSM is further configured to execute a behavior in response to detection of the type of the input action, and wherein, as one behavior, the IBSM is configured to restore a prior state when the IBSM determines that at least part of the input action is unintentional.

15. The computing device of claim 1, wherein the IBSM is further configured to execute a behavior in response to detection of the type of the input action, and wherein, as one behavior, the IBSM is configured to correct an interpretation of said at least one contact input event to remove effects of said at least one movement input event when the IBSM determines that at least part of the input action is unintentional.

16. A method for controlling a computing device in response to unintentional movement of the computing device, comprising:

receiving at least one contact input event from at least one touch input mechanism in response to contact with the computing device in a prescribed manner;

receiving at least one movement input event from at least one movement-type input mechanism in response to movement of the computing device;

detecting a type of input action associated with the contact with the computing device based on said at least one contact input event and said at least one movement input event;

rejecting at least part of said at least one contact input event when at least part of the input action is determined to correspond to an unintentional movement of the computing device; and automatically adjusting an indication of a location on the computing device at which at least one contact input event was received to change an interpretation of the at least one contact input event to account for the unintentional movement of the computing device.

17. The method of claim 16, wherein the input action is associated with picking up or setting down the computing device.

18. The method of claim 16, further comprising restoring a state prior to application of the input action.

19. The method of claim 16, further comprising repeatedly performing said detecting to improve a level of confidence at which the type of input action is detected.

20. A computer readable storage device for storing computer readable instructions, the computer readable instructions providing an interpretation and behavior selection module (IBSM) when executed by one or more processing devices, the computer readable instructions comprising:

logic configured to receive at least one contact input event from at least one touch input mechanism in response to contact with a computing device in a prescribed manner;

logic configured to receive at least one movement input event from at least one movement-type input mechanism in response to movement of the computing device;

logic configured to detect a type of input action associated with the contact with the computing device based on said at least one contact input event and said at least one movement input event; and logic configured to correct an interpretation of said at least one contact input event by automatically adjusting an indication of a timing at which the at least one contact input event was received to change an interpretation of the at least one contact input event to account for said at least one movement input event when it is determined that at least part of the input action is unintentional.

\* \* \* \* \*